United States Patent [19]

Takahashi et al.

[11] Patent Number: 5,537,173
[45] Date of Patent: Jul. 16, 1996

[54] FILM WINDING DETECTING MEANS FOR A CAMERA INCLUDING CONTROL MEANS FOR CONTROLLING PROPER AND ACCURATE WINDING AND REWINDING OF A FILM

[75] Inventors: Shinya Takahashi, Kodaira; Nobuyuki Tanaka, Hidaka, both of Japan

[73] Assignee: Olympus Optical Co., Ltd., Tokyo, Japan

[21] Appl. No.: 139,320

[22] Filed: Oct. 20, 1993

[30] Foreign Application Priority Data

Oct. 23, 1992 [JP] Japan .................................. 4-286335
Oct. 28, 1992 [JP] Japan .................................. 4-290523

[51] Int. Cl.⁶ ................................................. G03B 1/18
[52] U.S. Cl. ............................. 354/173.1; 354/173.11; 354/214
[58] Field of Search ...................... 354/173.1, 173.11, 354/212, 213, 214, 217, 218

[56] References Cited

U.S. PATENT DOCUMENTS 4,547,054 10/1985 Bridges ................................ 354/268
5,235,365 8/1993 Takatori et al. .................. 354/173.11

FOREIGN PATENT DOCUMENTS 62-238541  10/1987  Japan .
2-67534    3/1990   Japan .
2-113230   4/1990   Japan .
3-37646    2/1991   Japan .
3-54920    5/1991   Japan .
4-76526    3/1992   Japan .
4-274417   9/1992   Japan .

Primary Examiner—Michael L. Gellner
Assistant Examiner—J. K. Han
Attorney, Agent, or Firm—Louis Weinstein

[57] ABSTRACT

A film magazine is loaded. A fork capable of engaging with a spool is caused to engage the spool and is rotated to perform film initial sending. Then, an engaged state of the fork with the spool is detected by a fork switch. A rotational quantity of the fork is detected from the point when the fork completely engages the spool. Thus, more accurate film initial sending quantity is measured. If an error is made in the sending operation and predetermined quantity of film initial sending cannot be sent, film is rewound on the basis of film sent quantity. Accordingly, an operation of film initial sending can be performed again.

41 Claims, 17 Drawing Sheets

→ DRIVING SIDE
--→ DRIVER SIDE

→ DRIVING SIDE
-- → DRIVER SIDE

FILM WINDING DETECTING MEANS FOR A CAMERA INCLUDING CONTROL MEANS FOR CONTROLLING PROPER AND ACCURATE WINDING AND REWINDING OF A FILM

BACKGROUND OF THE INVENTION

1. Field of the Invention

The present invention relates to a camera and more particularly to a camera using an automatic sending-type film magazine.

2. Related Art Statement

Various proposals on a camera which can perform film initial sending by using an automatic sending-type film magazine or on the film magazine have been provided. The film magazine for photography disclosed in Japanese Patent Laid Open No. H3-37646/1991 performs film sending by pressing the film against a film spool from the magazine's inner wall surface and rotating the film spool and moving the film as an unit.

In the camera for a film magazine disclosed in Japanese Patent Laid Open No. H2-113230/1990, a film magazine having a built-in sprocket is applied. Moved quantity of film is detected by the rotation of the built-in sprocket.

However, in the disclosure of the foregoing Patent Laid Open No.H3-37646, although idle running is produced at the time of connecting operation between a film spool in the magazine and a driving shaft in the camera, it is assumed that film is sent even at the idle running time of the initial driving stage and initial sending of the film is performed. Therefore, an error in the actual quantity of sent film was brought about.

Also, in the disclosure of the foregoing Patent Laid Open No. H2-113230, idle running was produced by meshing the sprocket in the magazine and the driving shaft in the camera. Similarly, an error in quantity of sent film was brought about.

With regard to a film feeding mechanism of a sending-type camera, for example, the film feeding mechanism of a camera disclosed in Japanese Patent Laid Open No. H2-67534 sends and rewinds a film by an intended rotation and reverse rotation of the spool in the magazine which rolled a film. The camera has a configuration which drives the spool and the spool for rolling a film in the camera by the same motor.

In addition, the camera film feeding mechanism disclosed in Japanese Utility Model Laid Open No. H3-54920/1991 sends a film by a motor's intended rotation and rewinds the film by a reverse rotation. At the initial film sending, the film is wound around a rolling spool in a camera and then, a driving transmission system of the spool is canceled and caused to follow a spool driving system in a camera.

Nevertheless, in the camera film feeding mechanism disclosed in the foregoing Patent Laid Open No. H2-67534, after an error is made at sending film when the film is loaded, an user has to manually rewind the film in the sending-type magazine without having a reader portion for drawing out, so that such a drawing-out operation is difficult.

The camera film feeding mechanism disclosed in the foregoing Utility Model Laid Open No. H3-54920 has also the same problem in the foregoing Japanese Patent Laid Open No. H2-67534.

OBJECTS AND SUMMARY OF THE INVENTION

The first object of the present invention is to provide a camera using a film sending-type magazine in which rotation of a shaft member of the film magazine can be detected and accurate and safe film initial sending can be performed.

The second object of the present invention is to provide a camera in which sent film can be returned to an original state accurately when a loading error is produced in a camera using the magazine of the film sending-type.

The first camera of the present invention can send a film. When a film in a magazine is sent, a spool contained in a film magazine is caused to engage with connecting shaft means which can be engaged by a movement in the shaft direction and the engaging shaft means is rotatively driven, so that film initial sending is performed. An initial sending operation is controlled by a sent quantity detected by detecting an effective rotational quantity of rotational quantity detecting means which detects a rotational quantity of the engaging shaft means.

The second camera of the present invention can send film in the same way as the first camera. When a film in a magazine is sent, sending driving means is driven. The film sent quantity is detected by rotational quantity detecting means. When the film sent quantity attains a specified quantity, the sending driving means stops. Instead, rolling spool driving means is driven and a film is rolled by rolling spool means. When a specified quantity is rolled, the sending driving means stops. If the specified quantity cannot be detected by the rotational quantity detecting means, rolling spool driving means is stopped, and the film is rewound by the quantity sent by rewind driving means.

Other features and advantages of the present invention will be sufficiently apparent from the following description.

DETAILED DESCRIPTION OF THE PREFERRED EMBODIMENTS

Embodiments of the present invention will be described on the basis of the drawings as follows.

Figure 1:
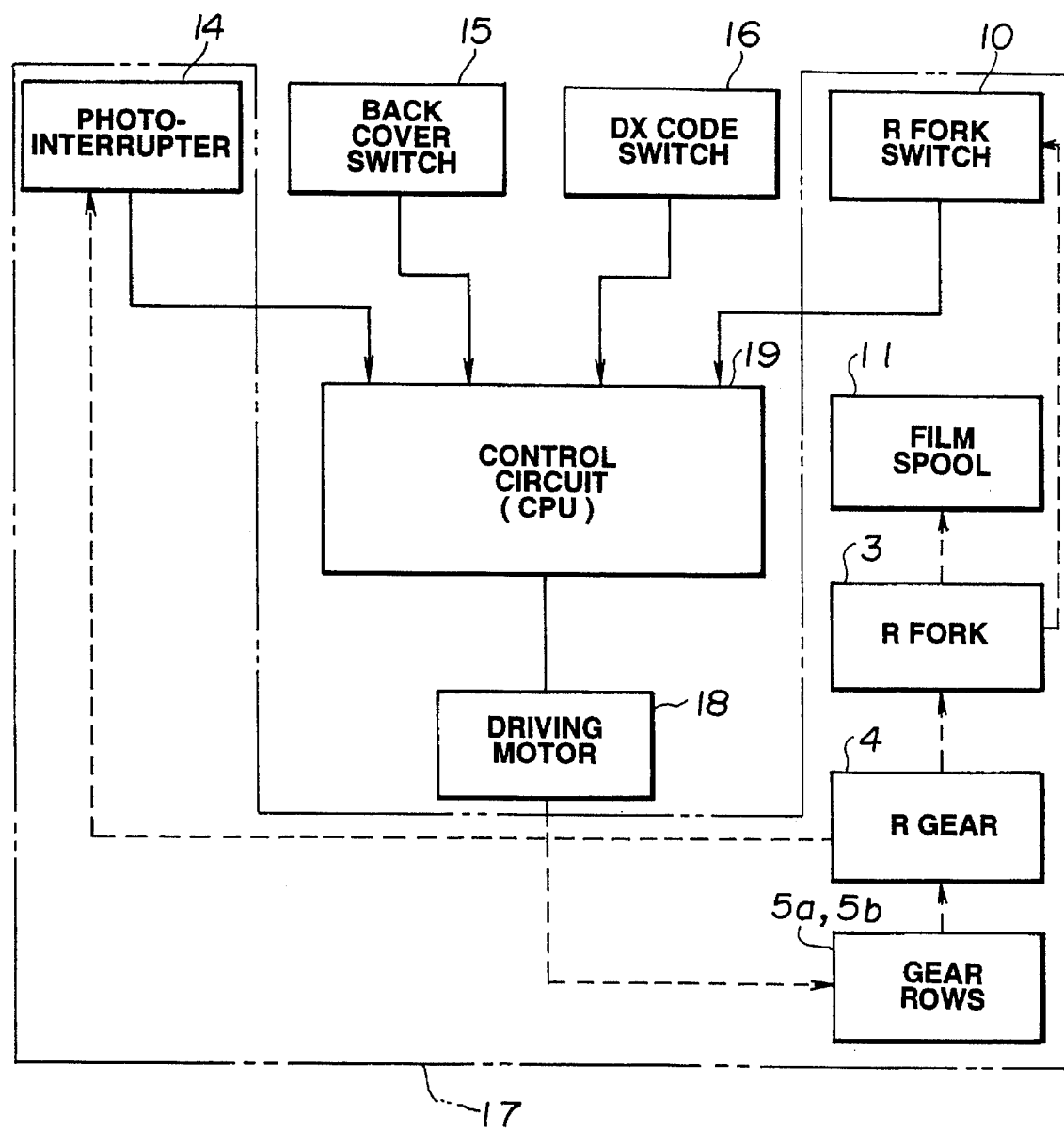
FIG. 1 is a main block diagram of a film feeding mechanism portion containing a camera film sending mechanism portion which shows the first embodiment of the present invention.

FIG. 1 is a block diagram of a film feeding mechanism portion containing a camera film sending mechanism portion which shows the first embodiment of the present invention. However, a film advancing control part, exposure control part, automatic focusing control part, and lens driving part are not illustrated.

The camera of this invention comprises a control circuit (CPU) 19 controlling each controlling element of the camera as shown in FIG. 1 and having a built-in controlling means for controlling a rotational quantity of a rewind fork gear 4 which is described later, a DX code switch 16 reading a DX code of a film and detecting whether a film magazine 12 is loaded or not, a back cover switch 15 detecting an open/closed state of a back cover, a driving motor 18 which is a driving means for driving film advancing and rewinding, and a film sending mechanism part 17.

The film sending mechanism part 17 performs film initial sending, film advancing at photographing, and film rewinding. The mechanism part 17 comprises a rewind fork (hereinafter, R fork) 3 which is a rotation transmitting shaft capable of engaging with a spool of a magazine, gear rows 5a and 5b transmitting driving force of the driving motor 18 to the R fork 3, a rewind gear (hereinafter, R gear) 4, the film spool 11 which is the rotation transmitting means for sending film and which is a shaft member of the film magazine, an R fork switch 10 which is a detecting means becoming an on state when the R fork 3 is connected to the film spool 11, and a photo-interrupter 14 for detecting the rotational quantity of the R gear 4.

The film sending mechanism part 17 will be described in detail.

Figure 2:
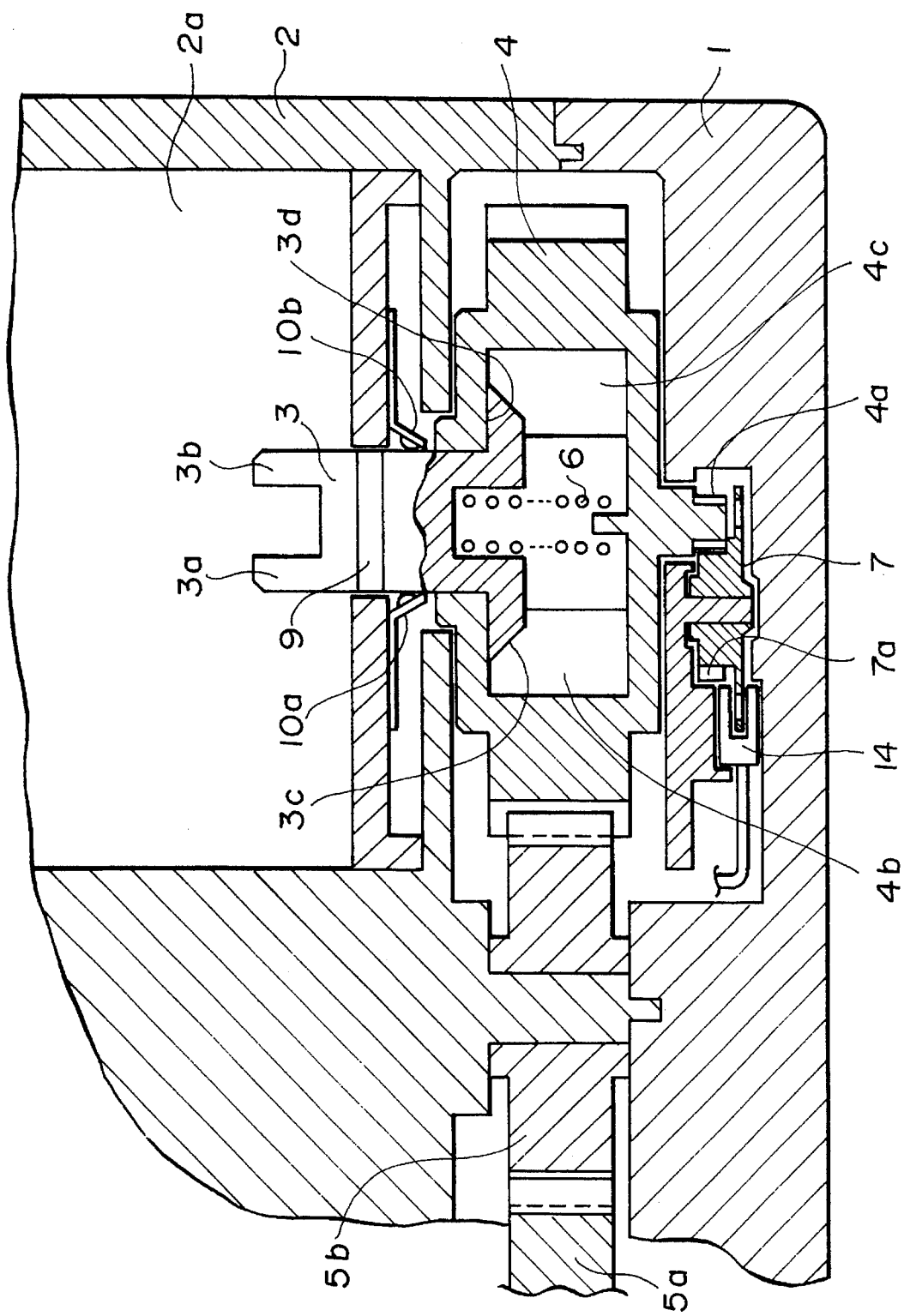
FIG. 2 is a sectional view showing a state in which a film magazine is yet to be loaded in the camera film sending mechanism portion in FIG. 1.
Figure 3:
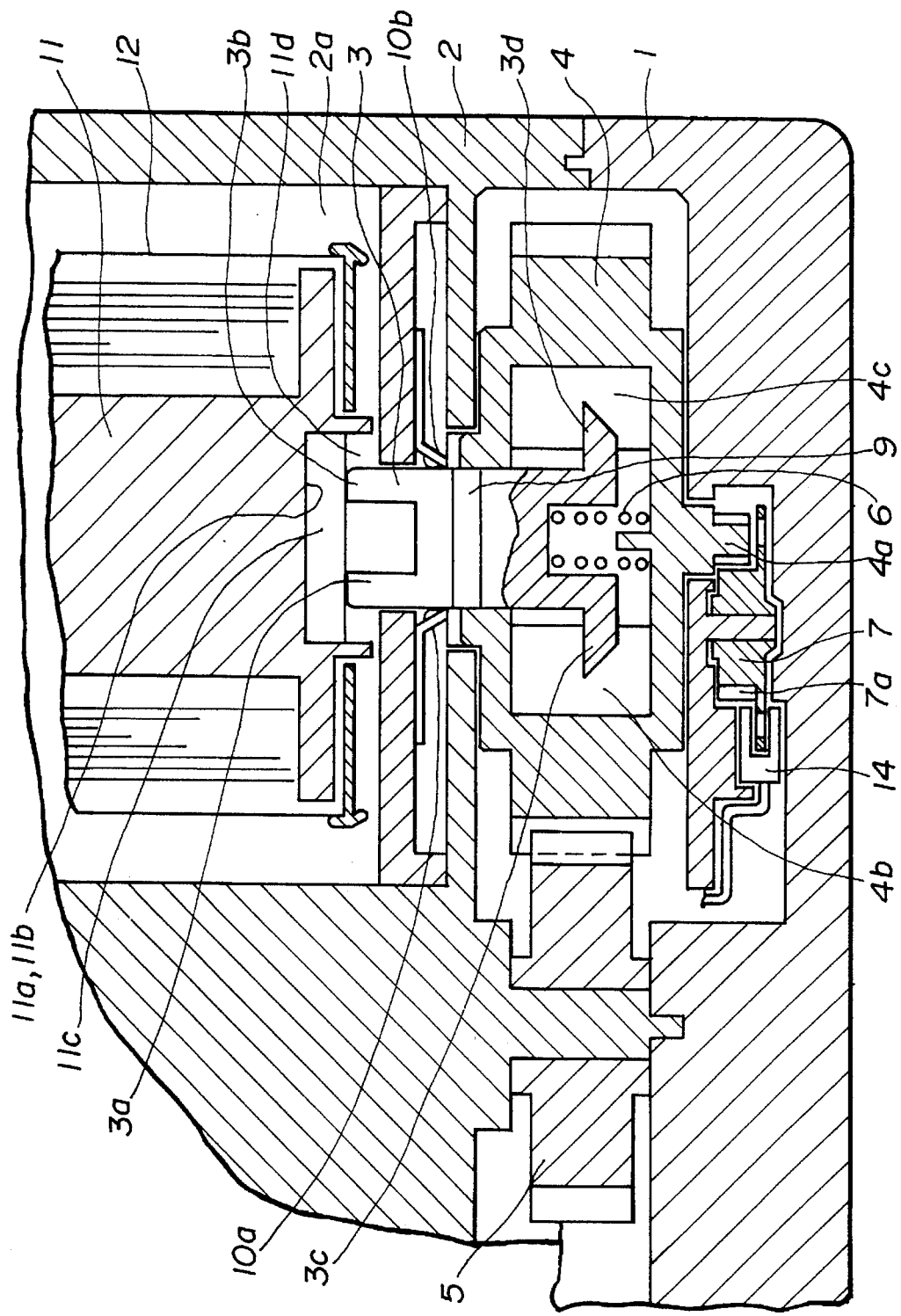
FIG. 3 is a sectional view showing a state in which a film magazine is loaded but a rewind fork is not yet connected in the camera film sending mechanism portion in FIG. 1.
Figure 4:
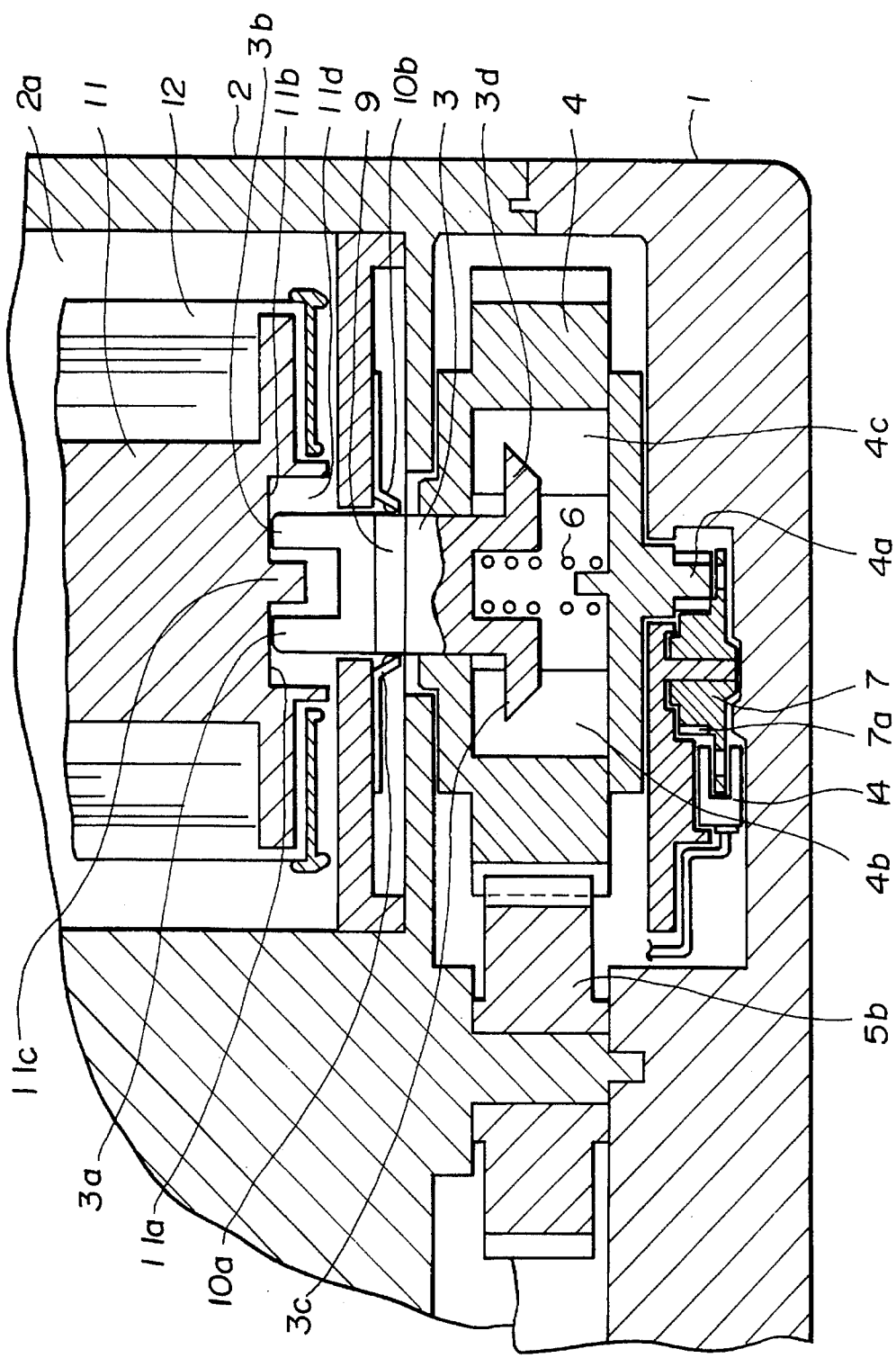
FIG. 4 is a sectional view showing a state in which a film magazine is loaded and a rewind fork is connected in the camera film sending mechanism portion in FIG. 1.

FIGS. 2 to 4 are sectional views of film initial sending operation of the film sending mechanism part 17. FIG. 2 is a sectional view when a film magazine 12 is not yet loaded. FIG. 3 is a sectional view when the film magazine 12 is loaded but the film spool 11 of the magazine and the R fork 3 are not fitted between fork parts 3a and 3b and a convex part 11c, and is not yet connected to the fork parts. FIG. 4 is a sectional view when the film magazine 12 is loaded and the R fork 3 is connected.

The R gear 4 rotatably supported by camera units 1 and 2 is driven by the driving motor 18 through the gear rows 5a and 5b. The R gear 4 is slidably supported in the shaft direction when legs 3c and 3d of the R fork 3 are controlled by guides 4b and 4c. Force is applied to the R fork 3 in the upward direction by a spring 6 arranged in the R gear 4. The legs 3c and 3d are slidably held at a state in which the legs 3c and 3d are fitted to the inner wall of the R gear 4 (see FIG. 2). Further, the R gear 4 engages a comb gear 7a which is fixed to an encoder 7 through a small gear part 4a provided at the end of the R gear 4. The encoder 7 is provided with slits along its outer periphery. The rotational quantity of the encoder 7 is detected by a photo-interrupter 14 which is a detecting means. Accordingly, the rotational quantity of the R fork 3 is detected.

The fork parts 3a and 3b are arranged at the distal end of the stem part of the R fork 3. Into the fork parts 3a and 3b, a convex part 11c of the film spool 11 arranged between grooves 11a and 11b can be fitted when the grooves 11a and 11b arranged at a hole part 11d on the end surface of the film spool 11, which is rotatably positioned in the film magazine 12, form a specified relative phase. The fitted state is held by the force of the spring 6. The rotation of the R fork 3 becomes a state transmittable to the film spool 11, or a connected state (see FIG. 4).

Figure 5:
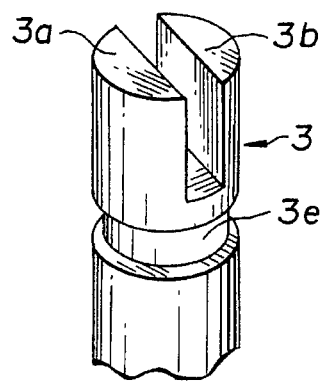
FIG. 5 is a perspective view showing a state of a system portion of a rewind fork in the camera film sending mechanism portion in FIG. 1.

The stem part of the R fork 3 is provided with a groove 3e extending around the stem shown in FIG. 5. A contact ring 9 made of conductive materials is fitted to the stem. Accordingly, the contact ring 9 effectively never moves. The stem part of the R fork 3 consists of insulators.

As shown in FIG. 4, when the convex part 11c is fitted into the region between fork parts 3a and 3b of the R fork 3 through a hole part 11d of the film spool 11 and the R fork 3 is connected to the film spool 11, contact springs 10a and 10b having spherical contact points are arranged in parts facing the contact ring 9. The contact ring 9 and contact springs 10a and 10b are in their conductive states, specifically, an R fork switch 10 consisting of the contact springs 10a and 10b is in an on state.

When the R fork 3 and the film spool 11 are not connected as shown in FIG. 3, the contact ring 9 is displaced from to the contact springs 10a and 10b to form a nonconductive state and the R fork switch 10 is an off state.

Next, film loading of a camera in this embodiment formed as the foregoing and an operation, such as feeding film will be described.

When film is sent and rewound, the film spool 11 is rotated with the R gear 4 as a unit so as to send and rewind film by driving the R gear 4 through gear rows for sending and rewinding film (not illustrated) and the gear rows 5a and 5b by means of the driving motor 18. Simultaneously, the encoder 7 is rotated. Fed quantity of film is measured by counting output pulses of the photo-interrupter 14.

With regard to film loading and film initial sending operation, when the film magazine 12 is not loaded as shown in FIG. 2, the R fork 3 is pressed upward by applying force of the spring 6. The contact springs 10a and 10b are in the nonconductive states, that is, the R fork switch 10 is off.

If a back cover (not illustrated) is opened and the film magazine 12 is loaded, the R fork 3 is pressed and goes down as shown in FIG. 3. However, the R fork 3 and the film spool 11 are kept uncoupled, because the fork parts 3a and 3b are not fitted to the convex part 11c. The contact springs 10a and 10b are displaced from their conductive positions, so that a nonconductive state, or an off state of the R fork switch 10 is kept. A phase relation of the R fork 3 or the film spool 11 might cause to fit the fork parts 3a and 3b of the R fork 3 to the groove parts 11a and 11b of the film spool 11 and form a coupled state. At this moment, the R fork switch 10 becomes an on state. Since the back cover switch 15 is kept off, the driving of the R fork 3 is not started.

Then, when the back cover is closed, the back cover switch 15 is an on state so as to start the driving motor 18 and rotate the R fork 3. After several rotations, the fork parts 3a and 3b of the R fork 3 are fitted to the grooves 11a and 11b of the film spool 11 and both form a coupled state as shown in FIG. 4. The R fork switch 10 becomes an on state, as well. From this point, film initial sending starts. Simultaneously, output pulses of the photo-interrupter 14 is started to be counted by the CPU 19. When pulses corresponding to initial sending of the specified film quantity are counted, it is judged that the initial sending ends. Then, a driving motor 18 is stopped to cause pictures to be able to be taken.

Figure 6:
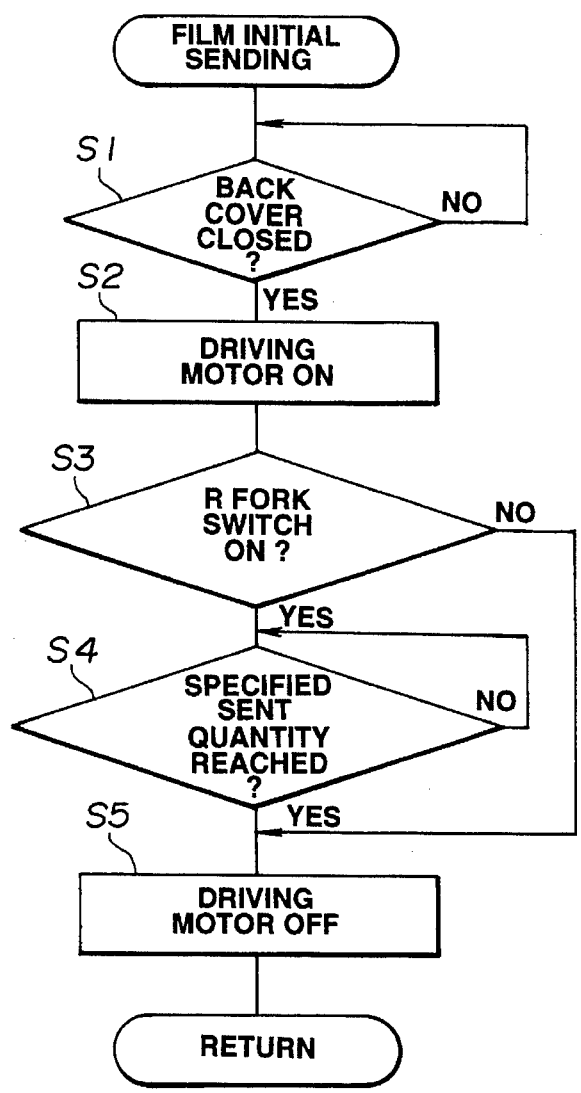
FIG. 6 is a flowchart of a camera film initial sending process in FIG. 1.

The operation of loading a film will be described in the flowchart in FIG. 6. First, an open/close state of a back cover is checked using an output signal of the back cover switch 15 in a step S1. When the back cover is closed, the operation proceeds to a step S2 where a driving motor 18 starts. In this step, the state of the R fork switch 10 is checked. If the state is off, it is judged that the film magazine 12 is not loaded and then, the operation jumps to a step S5 where the rotation of the driving motor 18 stops and the routine ends.

If the R fork switch 10 is on, it is judged that the film spool 11 is connected to the R fork 4, and then, a step S4 is followed. Film is initially sent by the rotation of the film spool 11. The quantity of the sent film is measured by means of the number of output pulses of the photo-interrupter 14. When a specified quantity of the film is initially sent, the operation proceeds to a step S5 where this routine ends.

As described above, in the initial sending operation in the camera film sending mechanism of the present embodiment, even if an idle running state is produced between the R fork 3 on the driving side and the film spool 11 on the magazine side at starting, the CPU 19 judges that the film is not sent during a period of the idle running by means of an off signal of an output signal from the R fork switch 10. Therefore, only the quantity of the sent film is detected. Then, an accurate initial sending process is conducted.

Next, a film feeding mechanism containing a camera film sending mechanism in the second embodiment of the present invention will be described.

A configuration of the film sending mechanism in the camera film feeding mechanism of the present invention is similar to the configuration of the camera in the first embodiment shown in FIG. 1. However, configurations and operations of a DX code switch, an R fork switch, and an R fork are different from the first embodiment.

Specifically, a DX code switch 16 in this embodiment detects a film DX code. By means of the input of its DX code signal, whether a film magazine 12 is loaded or not is detected. In an R fork switch 20 which is a detecting means applied to the camera of this embodiment and an R fork 23 which is a rotation transmitting means, heights of fork parts 23a and 23b of the R fork 23 and an arranged position of a contact ring 29 are different from the same ones in the first embodiment. Also, the same reference numerals are used for the same configuration elements in the first embodiment.

Figure 7:
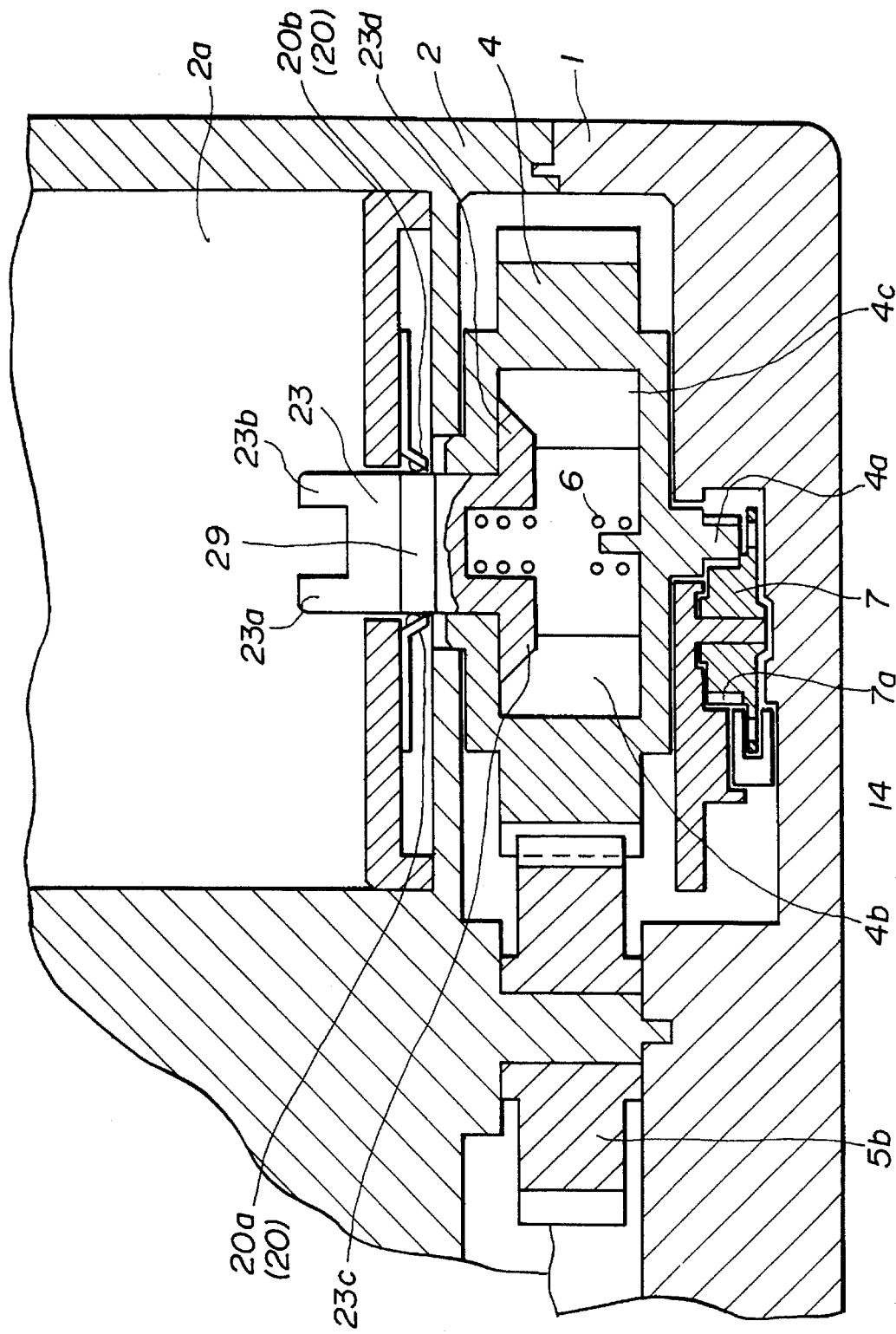
FIG. 7 is a sectional view showing a state in which a film magazine is yet to be loaded in a camera film sending mechanism showing the second embodiment of the present invention.
Figure 8:
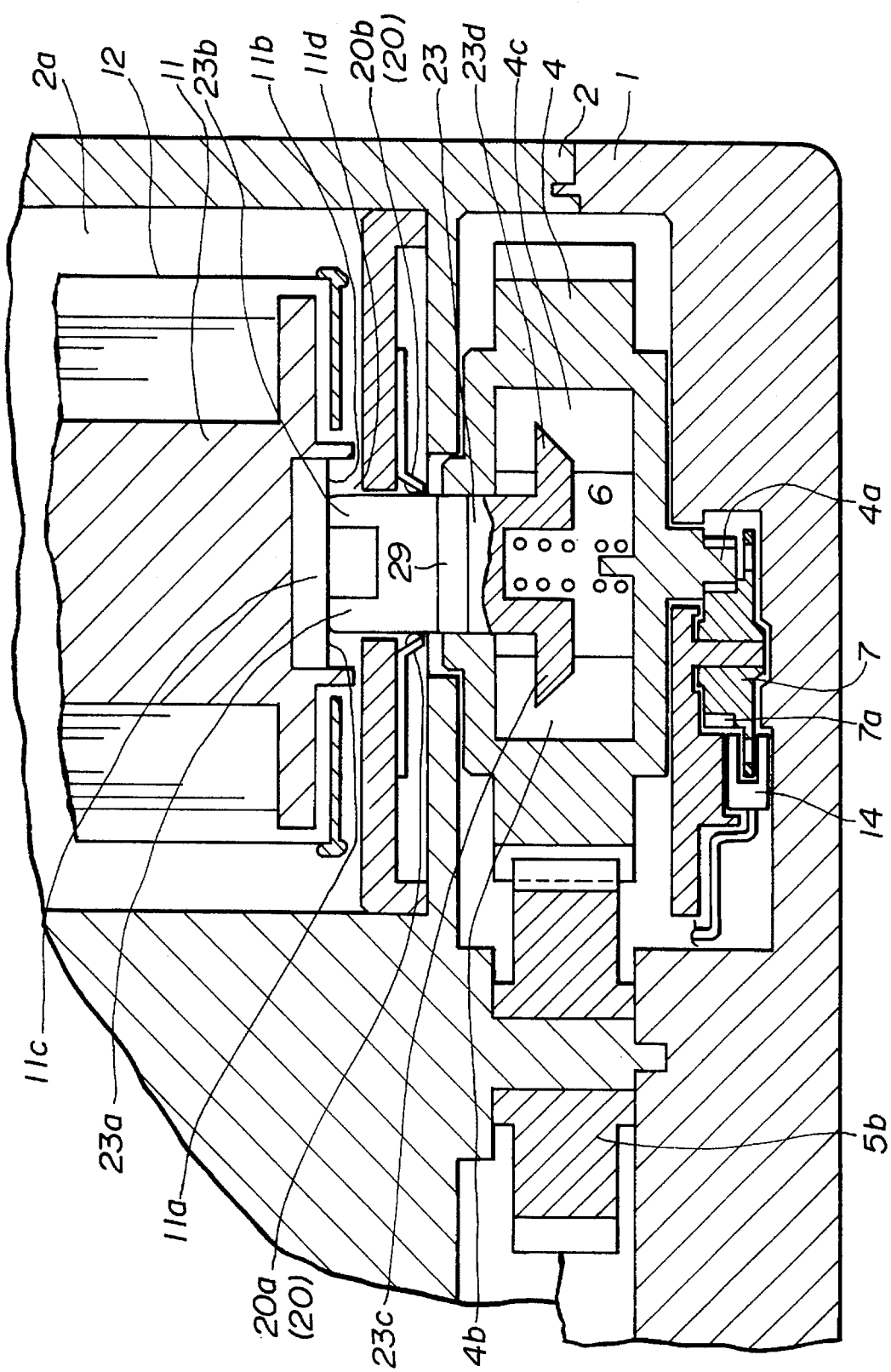
FIG. 8 is a sectional view showing a state in which a film magazine of the camera film sending mechanism portion in FIG. 7 is loaded but a rewind fork is yet to be connected.
Figure 9:
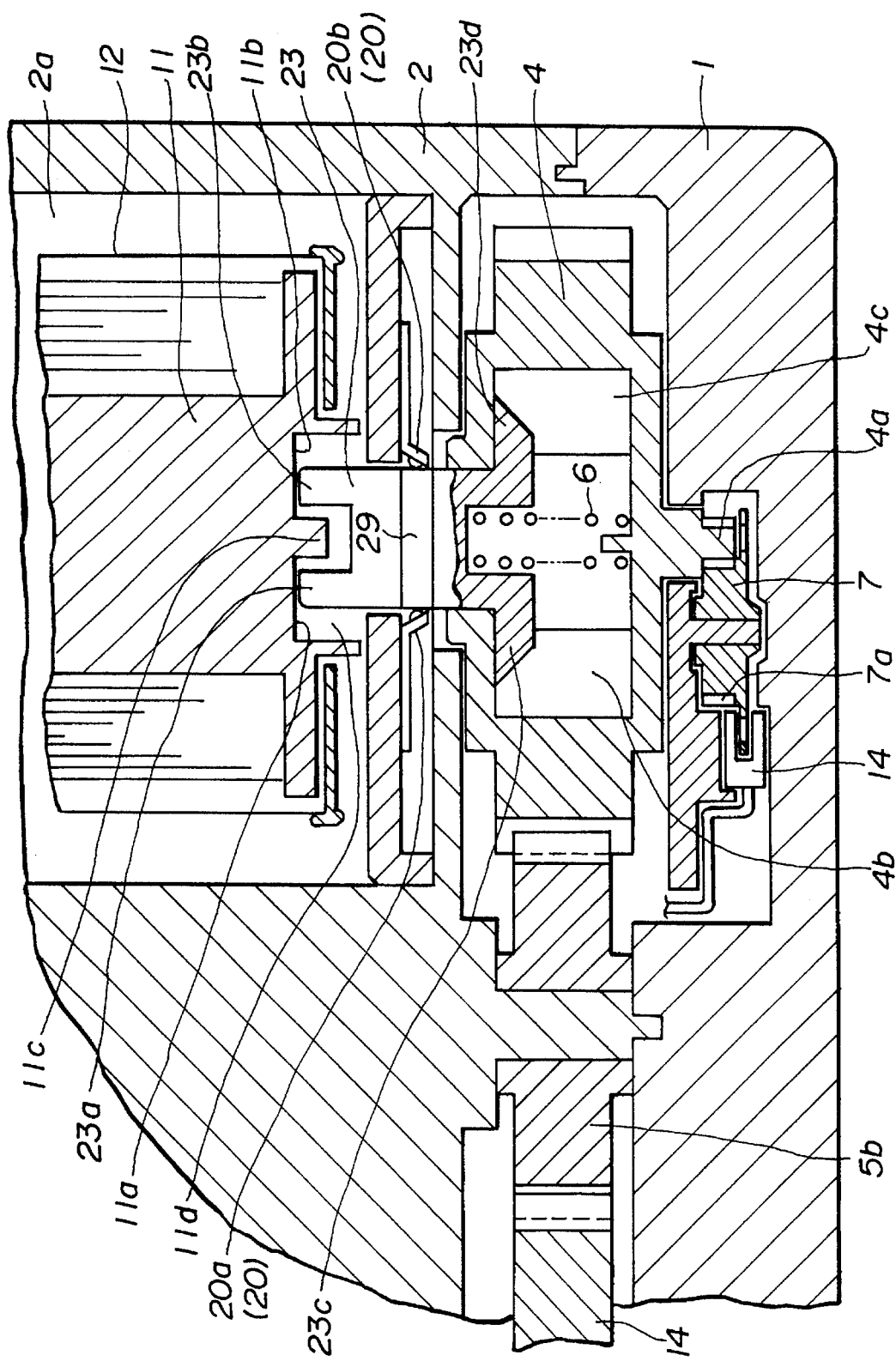
FIG. 9 is a sectional view showing a state in which a film magazine of the camera film sending mechanism portion in FIG. 7 is loaded and a rewind fork is connected.

FIGS. 7 to 9 are sectional views showing film initial sending operation states in a film sending mechanism part to which an R fork switch 20 and an R fork 23 are applied. FIG. 7 shows a state in which a film magazine 12 is not yet loaded. FIG. 8 shows a state in which the film magazine 12 is loaded; however, a film spool 11 of the magazine 12 is not yet connected to an R fork 3. FIG. 9 is a sectional view when the film magazine 12 is loaded and the R fork 3 is connected to the film spool 11.

As shown in FIG. 7, when no film magazine 12 is loaded, legs 23c and 23d of the R fork 23 are fitted to an R gear 4. The R fork switch 20 is an on state because a contact ring 29 is arranged in a position fitted to contact springs 20a and 20b forming the R fork switch 20.

When the film magazine 12 is loaded, the R fork 23 is pressed by the film spool 11 to be lowered as shown in FIG. 8. In this state, the R fork 23 and the film spool 11 are not yet connected. Then, the contact springs 20a and 20b form a nonconductive state and the R fork switch is off.

When the R gear 4 rotates, the fork parts 23a and 23b of the R fork 23 project as shown in FIG. 9 and enter a hole part 11d on the end surface of the film spool 11 so as to be engaged with grooves 11a and 11b and a convex part 11c. Then, the R fork 23 and the film spool 11 form a connected state. In this state, the contact springs 20a and 20b become conductive and the R fork switch 10 is on.

The other configurations besides the aforesaid are the same as the configurations in the first embodiment.

Figure 10:
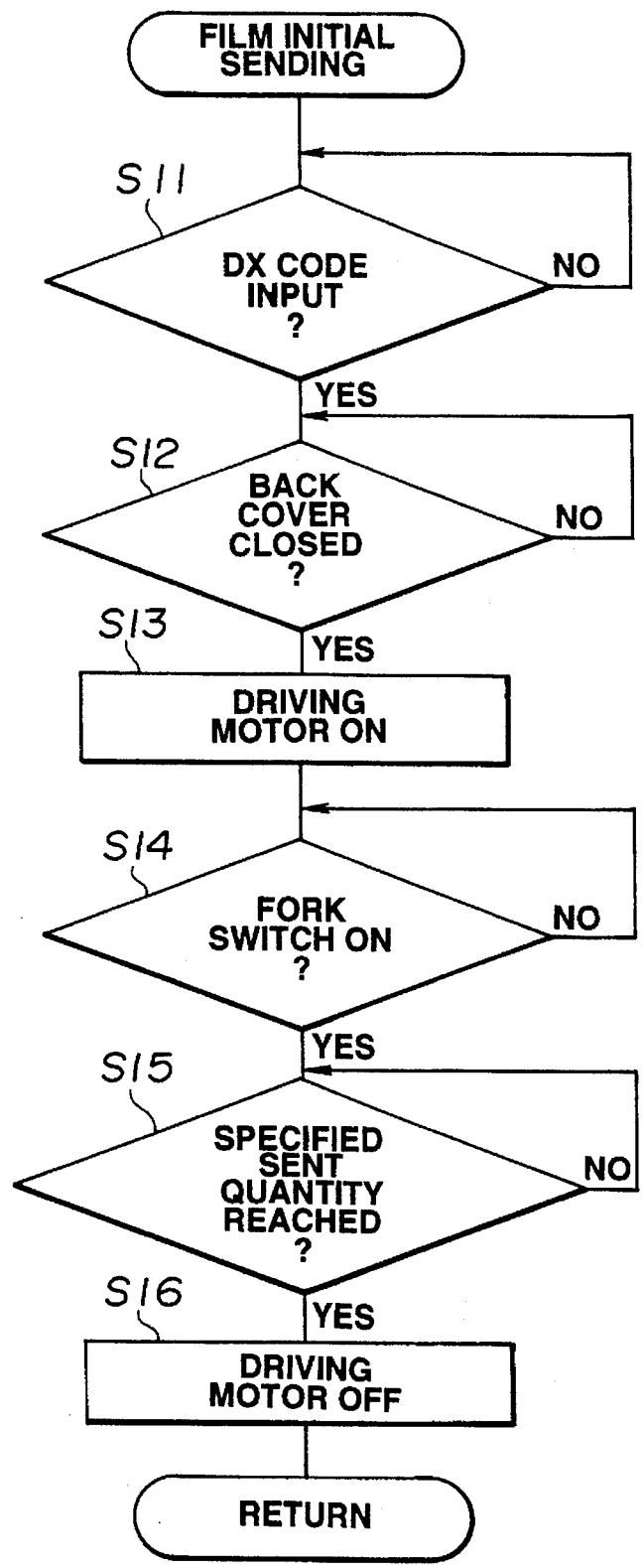
FIG. 10 is a flowchart of a camera film initial sending process in FIG. 7.

The film initial feeding operation of the camera of this embodiment will be described in the flowchart of a "film initial sending" process in FIG. 10. First, whether the DX code is input or not is checked by a DX code switch 16 in a step S11. If the code is input, the film magazine 12 is judged to be loaded and the operation proceeds to a step S12.

The R fork 23 is pressed down and lowered by loading the film magazine 12. An output signal from the R fork switch 20 is once switched from on to off (see FIG. 8). Then, in the step S12, it is confirmed from a state of a back cover switch 15 that the back cover is closed. Succeedingly, the operation proceeds to a step S13.

In the step S13, a driving motor 18 is started to rotate the R fork 23. By the rotation, the fork parts 23a and 23b are fitted to the grooves 11a and 11b of the film spool 11, so that the R fork 23 is connected to the film spool 11. At this time, the R fork switch 20 is an on state (see FIG. 9). In a step S14, when the on state of the switch 20 is confirmed, the operation proceeds to a step S15 where detection of film sent quantity starts based on an output pulse of the photointerrupter 14 by transmission rotational quantity controlling means contained in the CPU 19. Then, when the quantity reaches a specified quantity of initial film sending, the operation proceeds to a step S16 where the driving motor 18 is stopped and time routine ends.

As described above, even if idle running is produced between the fork 3 and the spool 11 in the magazine at starting in the same manner as in the first embodiment, a film sent quantity is not detected during the idle running period and an accurate film initial sending process can be performed without producing an error in film initial sending by the idle running of the R fork.

In addition, a state loading the film magazine 12 is detected by the DX code switch 16 in this embodiment, so that the driving motor 18 does not start even when the back cover is closed in a state where the magazine 12 is not loaded. In the state when the magazine 12 is not loaded, the R fork switch 20 may be on. Therefore, the distance in which the R fork 23 is projected into a magazine compartment 2a can be reduced as shown in FIG. 7. Thus, a stable operation can be obtained.

Next, a camera film feeding mechanism showing the third embodiment of the present invention will be described.

Figure 11:
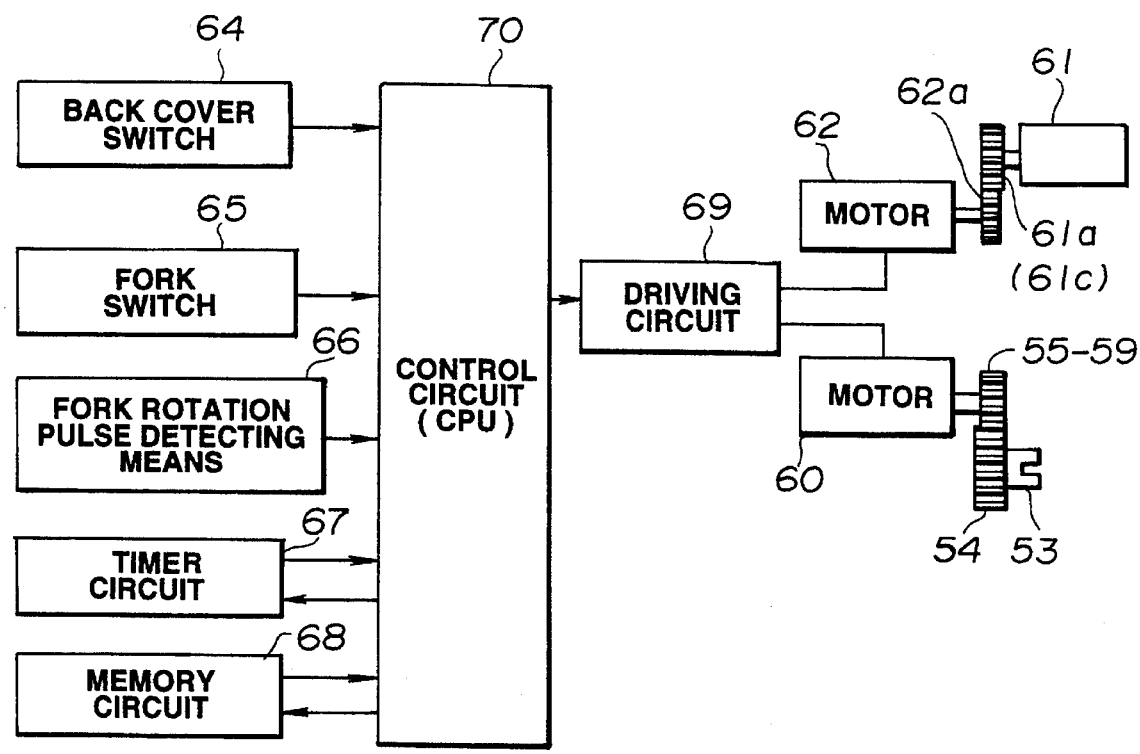
FIG. 11 is a main block diagram of a film feeding mechanism portion containing a camera film sending mechanism showing the third embodiment of the present invention.

FIG. 11 is a main block diagram of a film feeding mechanism portion containing a film sending mechanism portion of the aforesaid camera. The film feeding mechanism of this embodiment comprises a back cover switch 64 detecting that the back cover is closed, a fork switch 65 which is engagement detecting means for detecting that a fork 53 engages with a spool groove 63 of a spool 71 (see FIG. 12) to send and rewind film described later, fork rotational quantity detecting means 66 for detecting rotation pulses of the fork 53, a timer circuit 67 for controlling time in which the fork 53 engages with the spool groove 63 or controlling time after driving is switched to a rolling spool 61 side, that is, processing time of steps S58 and S60 in FIG. 22 described later, a memory circuit 68 memorizing quantity of a film 52 drawn out from a magazine 51, that is, a quantity of rotation pulses after the fork 53 engages the spool groove 63, a control circuit (CPU) 70 controlling a driving circuit 69 by receiving the aforesaid information, a driving circuit 69 which is controlling means controlled by the control circuit 70 and drives motors 60 and 62, the driving fork motor 60 for driving a fork gear 54 through gears 55 to 59, such as a planet gear and a first gear, the spool driving motor 62 for driving a rolling spool 61 through a pinion 62a, a spool gear 61a, and an one-way clutch 61c, and the rolling spool 61.

The control circuit 70 has built-in detecting means for detecting moved quantity of film sent from the camera side, or the rolling spool 61 by effective rotational quantity of the fork 53 after the engaging operation of the fork 53. The control circuit 70 also has built-in error detecting means for detecting a film received state in the rolling spool 61 and detecting failure in receiving the film based on the film moved quantity information.

Figure 12:
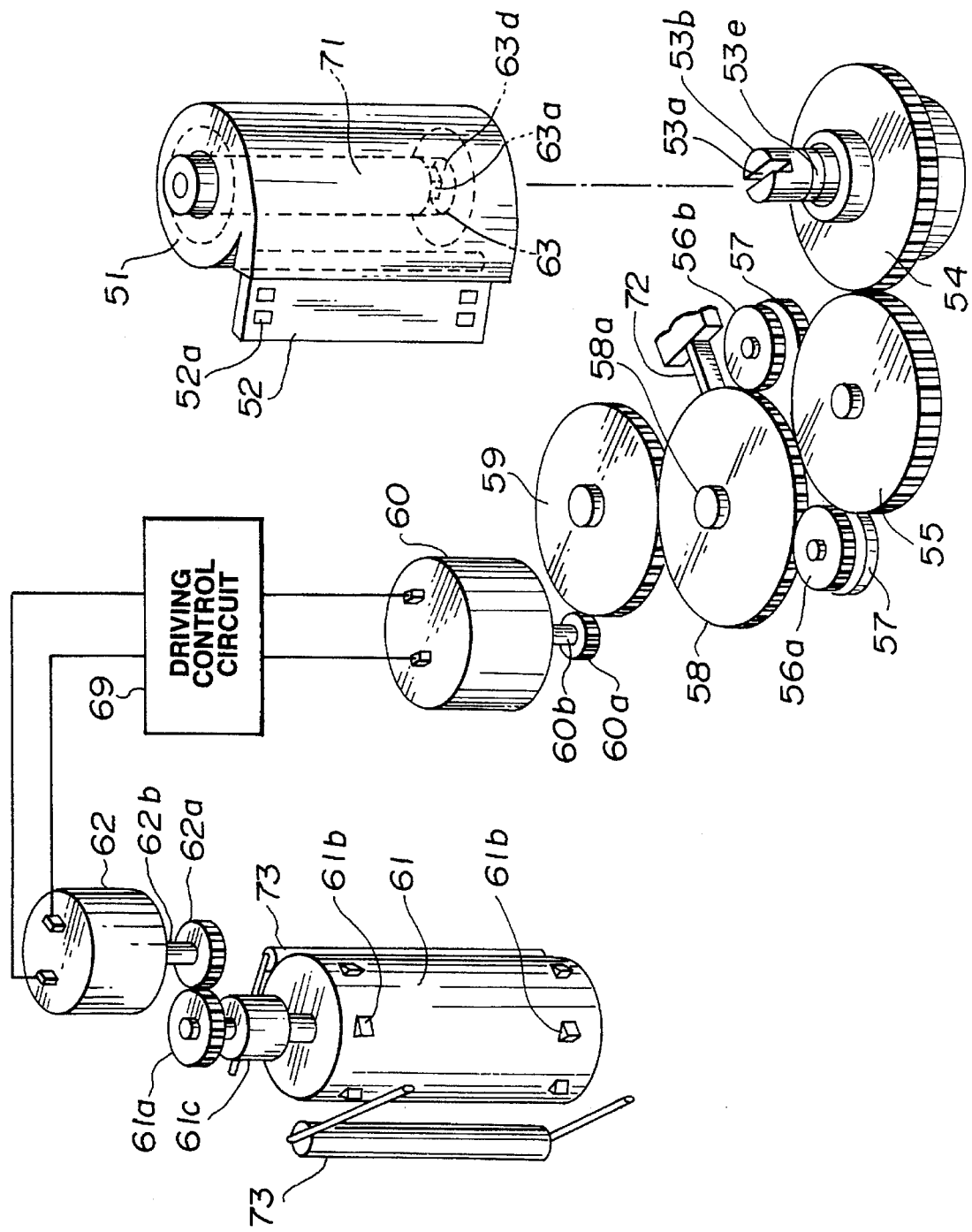
FIG. 12 is a perspective view showing a film driving system of the camera film feeding mechanism in FIG. 11.

FIG. 12 is a perspective view of a driving system of a film feeding mechanism containing a film sending mechanism portion of the camera in this embodiment. The film feeding mechanism comprises a sending and rewinding driving system in the film magazine, and a rewinding driving system in the spool. The magazine 51 applied to the mechanism has a built-in spool 71. A magnetic recordable film 52 or a conventional film is wound around the spool 71. The mechanism is a sending type in which the film 52 having perforations 52a is accurately sent by the rotation of the spool 71.

The sending and rewinding driving system will be described below. A hole part 63d on the bottom end of the spool 71 is provided with the spool groove 63. A fork part 53b of the fork 53 which is engaging shaft means can be fitted to the spool groove 63 through the hole part 63d of the spool 71 and can engage with a concave part 53a of the fork 53. Initial sending or rewinding of the film 52 is performed in an engaged state of the fork 53. The inner construction of the mechanism portions will be described in detail in conjunction with FIGS. 13 to 15.

A pinion 60a is fixed on an output shaft 60b of the fork driving motor 60. The pinion 60a engages with a second gear 59 and further, the second gear 59 engages with a sun gear 58. A pair of planet gears 56a and 56b are rotatably supported by a free end of a V-shaped planet lever 57, which is rotatably supported by a shaft 58a of the sun gear 58. Force is rotatively applied to the planet gear 57 so as to separate the planet gears 56a and 56b from a first gear 55 by means of a plate spring 72 having weak applying force. Accordingly, where the power of the motor 60 is not transmitted to the sun gear 58, the planet gears 56a and 56b are separated from the first gear 55 by means of the flat spring 72.

In the film initial sending state, the sun gear 58 rotates in the counterclockwise direction and the planet gear 57 rotates in the counterclockwise direction of the rotation of the sun gear 58 against the spring 72. The planet gear 56a engages with the first gear 55.

In the film rewinding state, the sun gear 58 rotates in the clockwise direction and the planet lever 57 rotates in the clockwise direction of the rotation of the sun gear 58 against the spring 72. The planet gear 56b engages with the first gear 55. The fork 53 is rotatively driven simultaneously with the first gear 55, because the first gear 55 always engages with the fork gear 54.

Next, a driving system around the spool 61 which winds a film after the film initial sending by the fork 53 will be described. The driving system is also the film rolling driving system.

The pinion 62a is fixed on the output shaft 62b of the rolling driving motor 62. The pinion 62a engages with the rolling spool gear 61a. the rolling spool gear 61a is loaded in the rolling spool 61 through the one-way clutch 61c arranged at the distal end of the rolling spool 61.

The one-way clutch 61c, which is a known clutch freely rotating in one direction, transmits rotational driving force to the rolling spool 61 when the rolling spool gear 61a rotates in the clockwise direction. To the contrary, when the rolling spool gear 61a rotates in the counterclockwise direction, the one-way clutch 61c has a clutch construction preventing the rotational driving force from being transmitted. Clicks (teeth) 61b engaging with the perforations 52a of the film 52 are arranged on a film rewinding surface of the rolling spool 61. A film pressure bar 73 for assisting in rolling the film 52 is provided.

In addition to the aforesaid construction elements, a back cover switch 64 for detecting that a back cover is closed, a fork switch 65 detecting that the fork 53 engages with the spool 63 described later, and rotational quantity detecting means 66 for detecting a fork rotation pulse described later are provided in the mechanism (these elements are not illustrated).

Next, a mechanism around a fork will be described in conjunction with FIGS. 13 to 15. The mechanism portion is an inner construction of the driving system for film sending and rewinding. However, the mechanism portion around the fork of the camera of this embodiment will be only outlined, because the mechanism portion has the same construction of that of the first embodiment.

Figure 13:
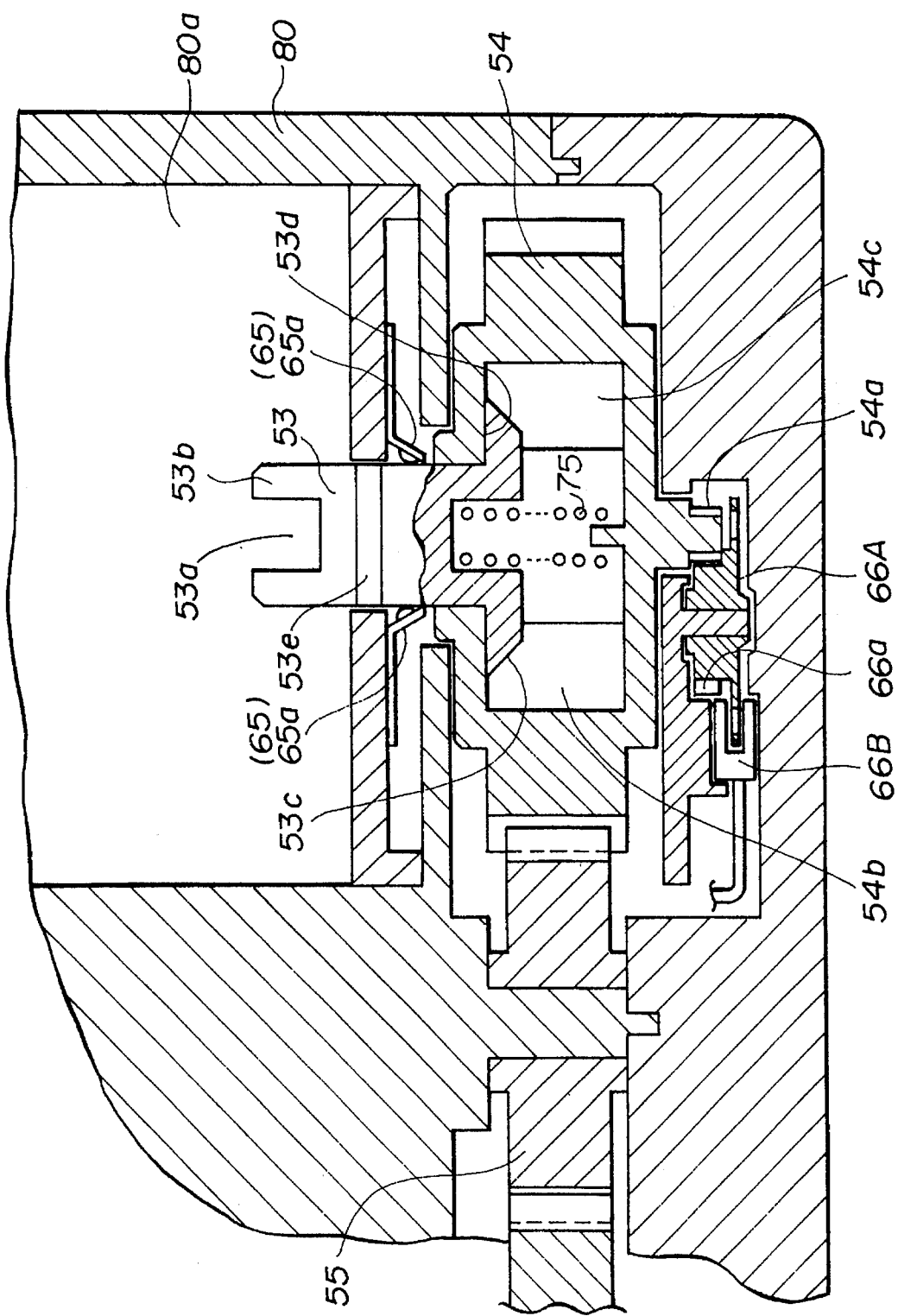
FIG. 13 is a sectional view around a rewind fork which is a sending mechanism portion in the camera film feeding mechanism in FIG. 11 and shows a state in which a magazine is yet to be loaded.
Figure 14:
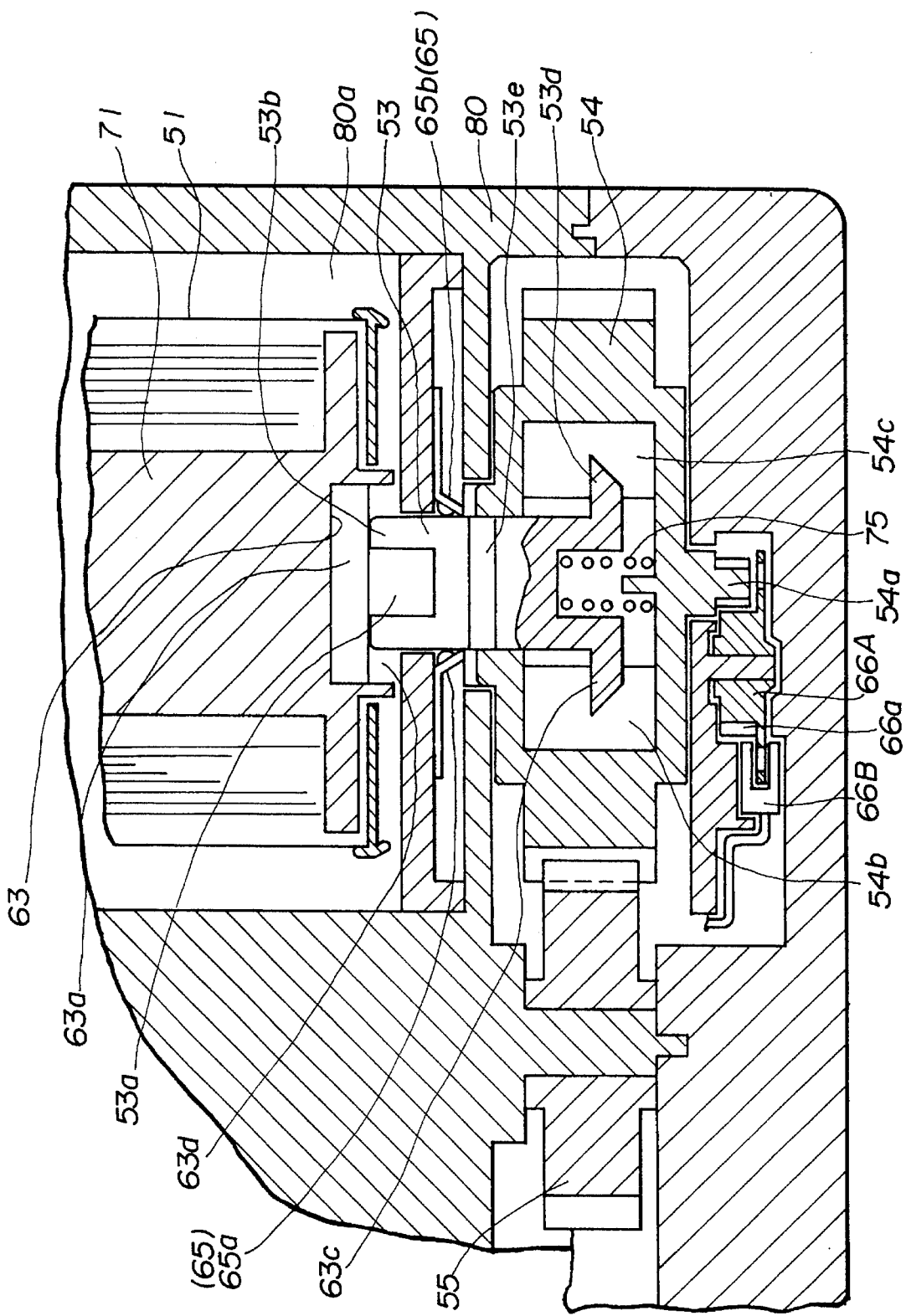
FIG. 14 is a sectional view around a rewind fork in the camera film feeding mechanism in FIG. 11 and shows a state in which a film magazine is loaded but the rewind fork is yet to be connected.
Figure 15:
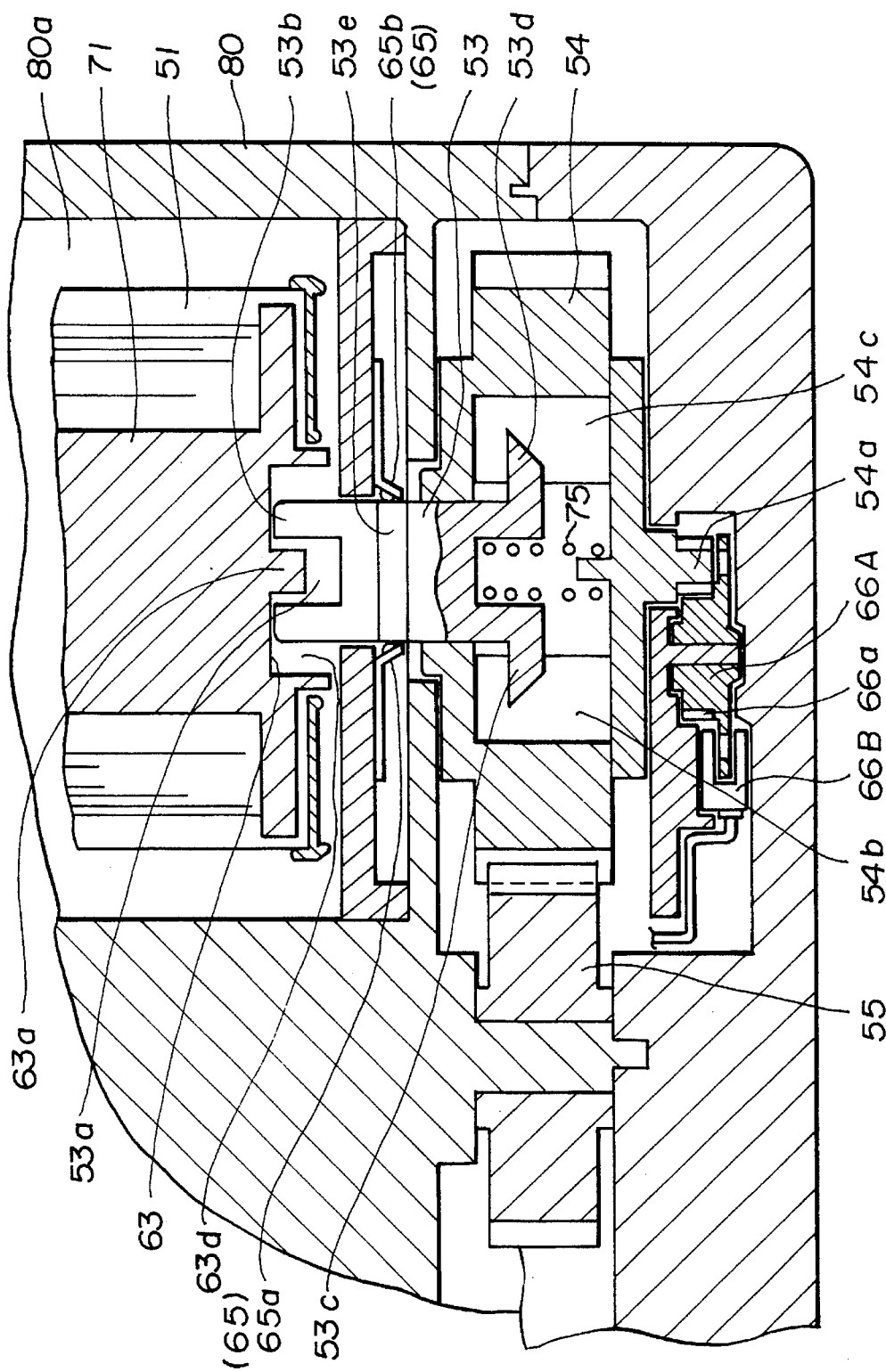
FIG. 15 is a sectional view around a rewind fork in the camera film feeding mechanism in FIG. 11 and shows a state in which a film magazine is loaded and the rewind fork is connected.

FIGS. 13 to 15 are sectional views in a state of a film initial sending operation in the mechanism portion. FIG. 13 is a sectional view in a state where the magazine 51 is not yet loaded. FIG. 14 is a sectional view showing that a state in which the magazine 51 is loaded in a magazine compartment 80a of a camera unit 80 but a spool 71 of the magazine is not fitted into the fork 53 and a groove 53a of a fork part 53b is not fitted into a concave part 63c of the spool 63. Thus, it is not an engaged state. FIG. 15 is a sectional view in which the magazine 51 is loaded and, further, the fork 53 is in an engaged state.

The fork gear 54 rotatably supported by the camera unit 80 is driven by the driving motor 60 through the first gear 55 or the like. When the legs 53c and 53d of the fork 53 are controlled by guides 54b and 54c, the fork gear 54 is slidably supported in the shaft direction. Further, force is applied to the fork 53 in the upper direction by a spring 75 (see FIG. 13).

In addition, the fork gear 54 engages with a comb gear 66a fixed to a disk encoder 66A with a slit forming fork rotational quantity detecting means 66 through a small gear part 54a. The rotational quantity of the encoder 66A is detected by a photointerrupter 66B forming the fork rotational quantity detecting means 66.

A fork part 53b is arranged at the distal end of the stem part of the fork 53. A concave part 63a of the groove 63 can be fitted into a groove 53a of the fork part 53b when the groove 63 and the spool 71 of the magazine 51 form a given relative phase. The fitted state becomes a state in which the rotation of the fork 53 can be transmitted to the spool 71, that is, an engaged state (see FIG. 15).

A contact ring 53e is fixed to the groove of the stem part of the fork 53. The stem part is made of insulators.

As shown in FIG. 15, when the fork 53 engages with the spool 71, contact springs 65a and 65b are positioned in parts facing the contact ring 53e. Therefore, the contact ring 53e and contact springs 65a and 54b are in conductive states, that is, the R fork switch 65 is on.

As shown in FIG. 14, when the fork 53 shown in FIG. 14 does not engage with the spool 71, the contact ring 53e is not coupled with the contact springs 65a and 65b and becomes a nonconductive state, that is, the R fork switch 65 is off.

The film initial sending operation of the sending mechanism formed as mentioned above will be described. First, when no magazine 51 is loaded as shown in FIG. 13, the fork 53 is pushed up by the applying force of the spring 75. Thus, the contact springs 65a and 65b are nonconductive, that is, the R fork switch 65 is off.

When the back cover (not illustrated) is opened and the magazine 51 is loaded, the fork 53 is pressed and lowered as shown in FIG. 14. However, the fork 53 and the spool 71 are kept unengaged because the fork part 53b is not fitted into the spool 71. The contact springs 65a and 65b pass conductive positions and keep nonconductive states, or the off state of the fork switch 65. The fork part 53b of the fork 53 is fitted into the convex part 63a of the spool 71 and may form an engaged state depending on a phase relation between the fork 53 and spool 71. At this time, the fork switch 65 becomes on. Since the off state of the back cover switch 64 is kept, the fork 53 is not started to be driven.

When the back cover is closed, the back cover switch 64 becomes on. Then, the motor 60 starts and the fork 53 rotates, and the fork part 53b of the fork 53 enters the convex part 63a of the spool 71 after several rotations to form an engaged state as shown in FIG. 15. Then, the fork switch 65 becomes on. From this point, film initial sending starts. Simultaneously, the output pulse of a photo-interrupter 66B is started to be counted at a control circuit 70.

Next, film sending and rewinding operations formed as mentioned above will be described in conjunction with FIGS. 16 to 19.

Figure 16:
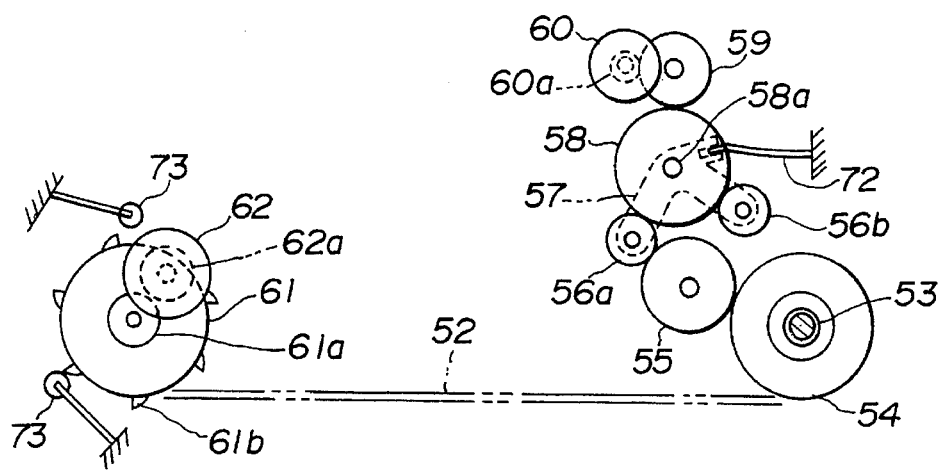
FIG. 16 is an arrangement plan view of a driving system of the camera film feeding mechanism in FIG. 11.

FIG. 16 is a diagram showing the arrangement of the film feeding mechanism shown in FIG. 12. As shown in this diagram, the driving system of film sending and rewinding, and the driving system driven by the motor 62 are arranged to face each other.

Figure 17:
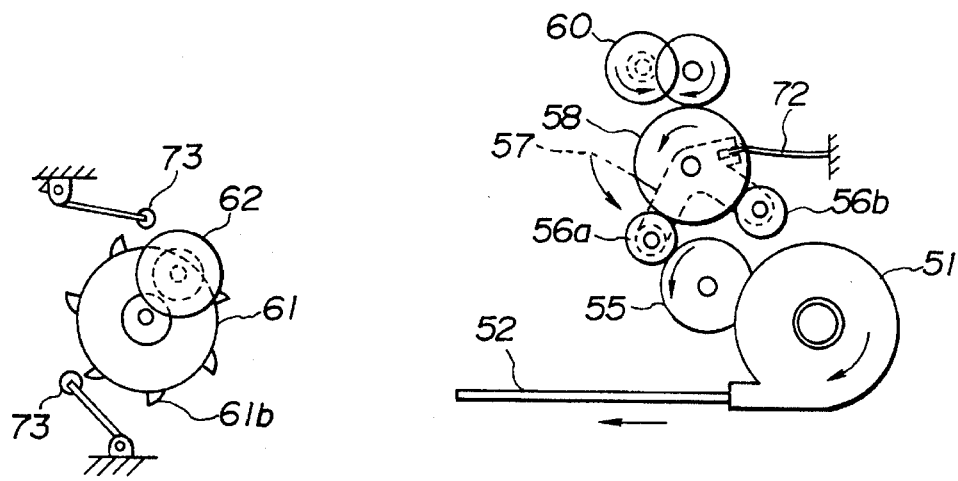
FIG. 17 is a diagram showing a sending side driving state of film initial sending operations of a driving system of the camera film feeding mechanism in FIG. 11.
Figure 18:
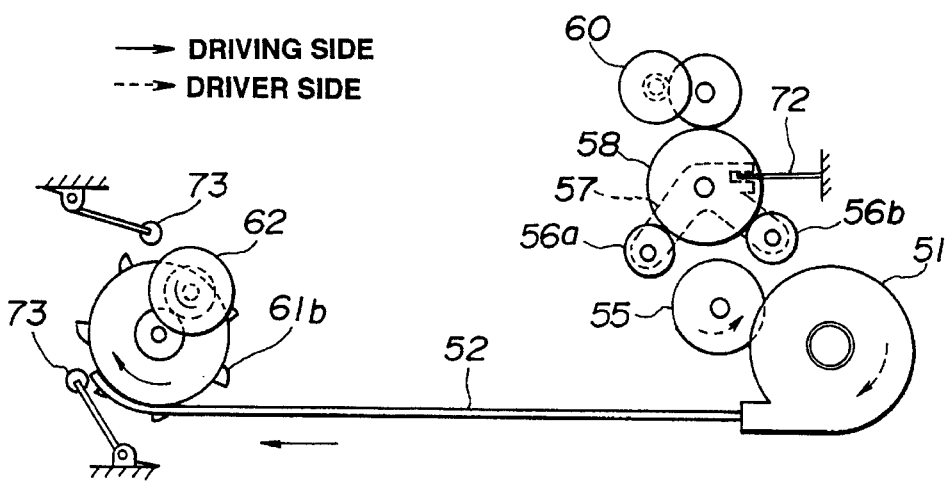
FIG. 18 is a diagram showing a driving state of a rolling side of film initial sending operations of a driving system of the camera film feeding mechanism in FIG. 11.
Figure 19:
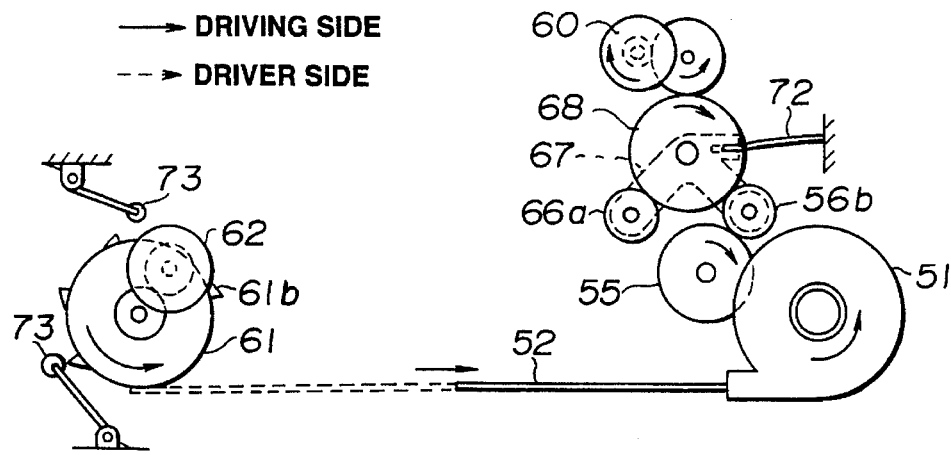
FIG. 19 is a diagram showing a film rewound state of a driving system of the camera film feeding mechanism in FIG. 11.

FIG. 17 is a state in which a film initial sending operation is performed by the motor 60. FIG. 18 is a state in which power to a fork driving motor 60 is changed over to a spool driving motor 62 and film is wound around a rolling spool 61. FIG. 19 is a state in which the film 52 is being rewound by the fork driving motor 60.

As shown in FIG. 17, the driving force of the motor 60 is transmitted from the pinion 60a to the second gear 59 and further to the sun gear 58 when the magazine 51 is loaded and the back cover is closed. In the film initial sending, the sun gloat 58 rotates in the counterclockwise direction, and then, a planet gear 56a rotatably supported by the planet lever 57 resists the plate spring 72 and moves. Thus, the planet gear 56a engages with the first gear 55. The first gear 55 engages with the fork gear 54, so that the rotation of the sun gear 58 is transmitted from the planet gear 56a to the fork gear 54. Then, the fork 53 engages with the spool groove 63. When the engaged state can be detected by the fork switch 65, film is started to be sent.

The sent quantity of the film 52 can be accurately counted by the photo-interrupter 66B of the fork rotational quantity detecting means since the engaged state is detected. When a specified film sent quantity (i.e. a first predetermined film sent quantity) is completed, a driving side power is changed over from the fork driving motor 60 to the rolling spool driving motor 62. FIG. 18 shows a state at the time of changing over.

When the motor 60 stops, the planet lever 57 rotates in such a manner in which the planet gears 56a and 56b both separate from the first gear 55 by means of the plate spring 72. After that, a rolling spool 61 becomes a driving side and the spool 71 becomes a driven side. When the film 52 capable of taking a picture is wound around the rolling spool 61, the automatic loading ends.

FIG. 19 shows a state in which taking a picture 1s completed and the film is being rewound. The rewind is carried out by driving the fork driving motor 60 in the counterclockwise rotation which is an opposite direction to the film initial sending shown in FIG. 17. In other words, the sun gear 58 rotates in the clockwise direction, so that the planet gear 56b rotatably supported by the planet lever 57 engages with the first gear 55. Driving force is transmitted from the first gear 55 to the fork gear 54 to rewind film. At this moment, the one-way clutch 61c is arranged between the rolling gear 61a and the rolling spool 61 that is a driven side. Thus, driving force is transmitted to the rolling gear 61a when rotating in the counterclockwise direction at the time of rolling film but is not transmitted when rotating in the counterclockwise direction at the time of rewinding film. Accordingly, the rolling spool 61 rotates smoothly in the counterclockwise direction and has no influence on film rewind.

Next, an operation when an error is made in film sending on the side of the fork 53, or in loading a film on the side of the rolling spool 61 will be described in conjunction with FIGS. 20 and 21.

Figure 20:
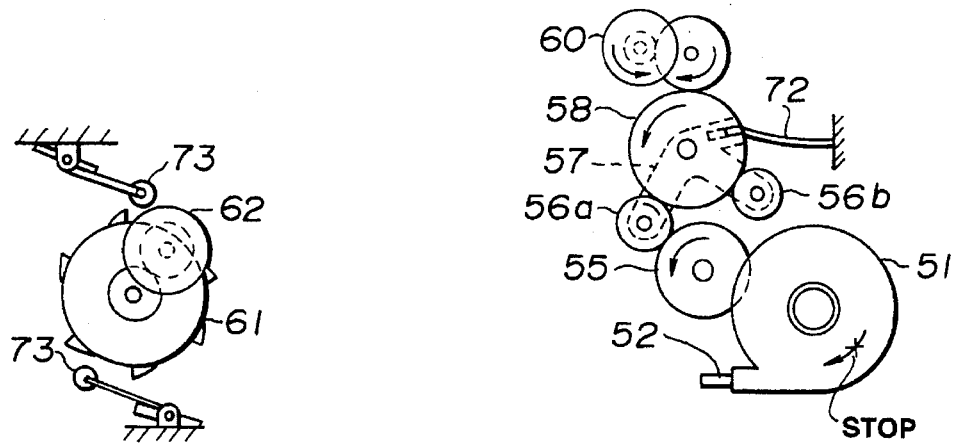
FIG. 20 is a diagram showing a state in which an operation error is produced on a sending side of a film initial sending operation of a driving system of the camera film feeding mechanism in FIG. 11.

FIG. 20 shows a state when an error is made in film sending on the side of the fork 3. First, when the magazine 51 is loaded and the back cover is closed, the fork driving motor 60 is driven and the fork 53 begins rotating. When it cannot be detected that the fork 53 engages with the spool groove 63 by the fork switch 65 even if the fork 53 rotates for a given time, it is judged that an error is made in film sending in the control circuit 70. Then, the driving of the motor 60 is stopped and film sending is halted. Then, the magazine 51 will be reloaded and an automatic loading will be performed.

Figure 21:
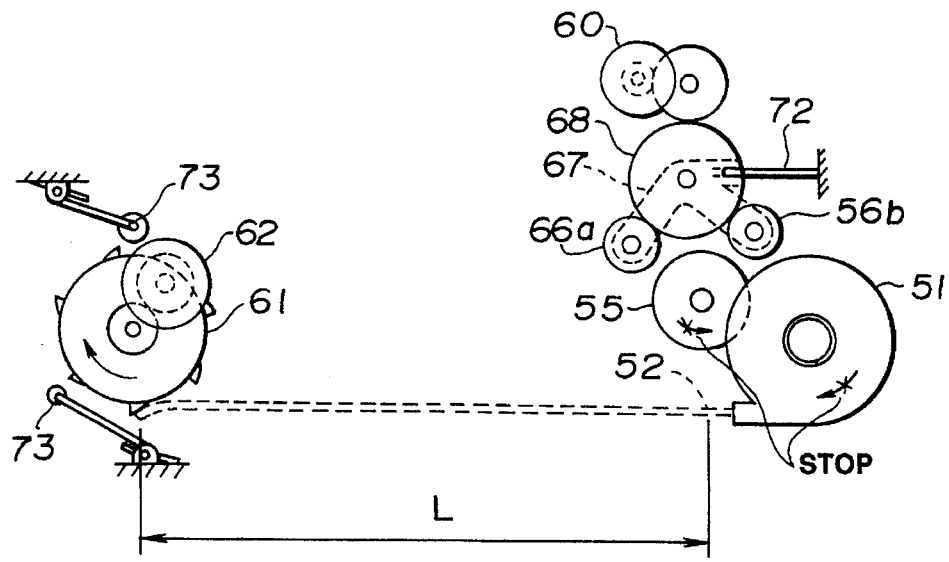
FIG. 21 is a diagram showing a state in which an operation error is produced on a film rolling side of a film initial sending operation of a driving system of the camera film feeding mechanism in FIG. 11.

FIG. 21 shows an example of a loading error on the side of the rolling spool 61. When a first predetermined length of film initial sending is completed by the fork 53, the driving side is switched from the motor 60 to the rolling spool driving motor 62. If the control circuit (CPU) 70 judges that the first given quantity of rotational pulses of the fork 53 could not be detected within a predetermined time at the rolling operation, that is, film cannot be rolled by the rolling spool 61 and preparation for photographing is not completed, the film rolling is stopped and the motor 60 is driven to be reversely rotated to rewind quantity L of the film 52 which was driven from the magazine 51. In this way, because sent length L of the film 52 is rewound, the magazine 51 is returned to the previous state in which the film was not loaded. Thus, the magazine 51 can easily send the film again.

Figure 22:
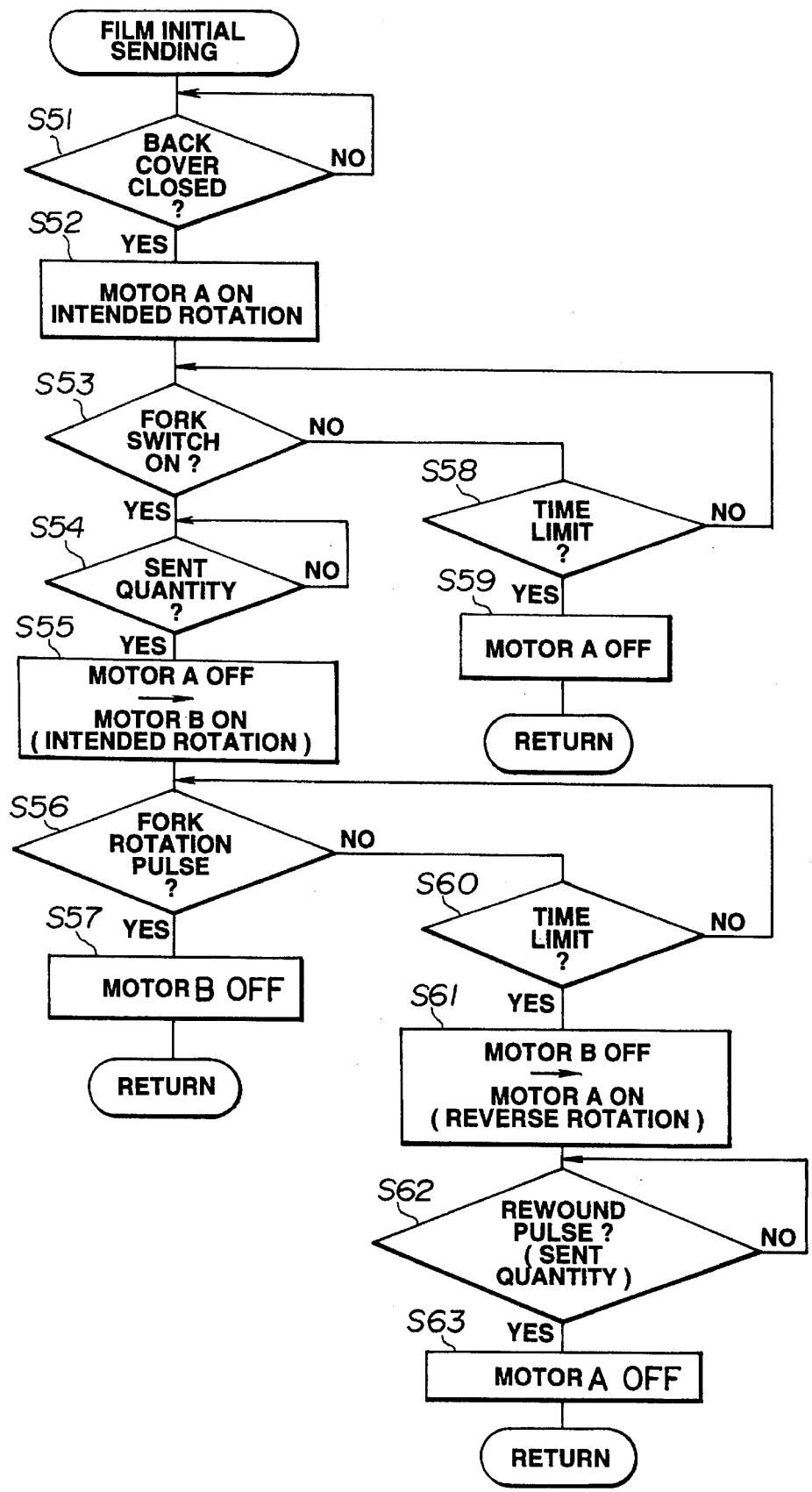
FIG. 22 is a flowchart of a film initial sending sequence in the camera film feeding mechanism in FIG. 11.

The aforesaid film initial sending operation will be described using the flowchart of the film initial sending sequence in FIG. 22.

First, the magazine 51 is loaded. The back cover switch 64 confirms whether the back cover is closed. Then, the fork driving motor 60 (motor A in the flow chart of FIG. 22) is started in the intended rotation direction (counterclockwise rotation) in steps S51 and S52. In a step S53, it is detected whether the fork 53 engages with the spool groove 63 by means of the output of the fork switch 65. When it cannot be detected within a time limit in which a given value is set, it is judged that a sending error is made (step S58), the motor 60 stops, and the loading stops. Also, when the magazine 51 is not loaded, an engaged state is not detected within a predetermined time. Thus, the motor 60 stops and the film sending operation stops.

At the same time, when the engaged state can be detected in the step S53, the sequence proceeds to a step S54 where the rotational pulses of the fork 53 are counted by means of the output pulses of the photo-interrupter 66B and a first predetermined length (i.e. quantity) of the film is initially sent while accurate film sent length is being measured.

When the initial sending is completed, the fork driving motor 60 becomes off and the rolling spool motor 62 (motor B in the flow chart of FIG. 22) becomes on, or a driving state (step S55). In a step S56, with only motor B on, the rotational pulses of the fork 53 are counted. When a second predetermined rolled quantity of the state in which preparation for photographing is completed cannot be obtained within a predetermined time limit, it is judged that a rolling error in the film initial sending is made (step S60). Then, the sequence proceeds to a step S61 where the motor 62 is off, the fork driving motor 60 is driven to be reversely rotated (clockwise rotation), and rewinding of the film 52 is started (step S61).

The drawn quantity of the film 52 until the step S61 is stored in the control circuit (CPU) 70. Thus, in a step S62, the drawn quantity, or the output pulses of the photointerrupter 66B corresponding to the length sent is counted down and rewound. When the predetermined quantity is rewound, the motor 60 becomes off (step S63) and the film sending operation stops.

In the film feeding mechanism of the camera of the present embodiments, even if an error in a film initial sending operation is produced on the side of the fork 53 or the side of the rolling spool 6]., the sent length of the film 52 until that point of time is precisely measured, so that it is possible to rewind the sent length to the side of the fork 53 and to return the magazine 51 to the original film loaded state.

As described above, when film cannot be sent during the loading operation of the film initial sending because of an error on the rolling spool side or the fork side, the quantity drawn from the magazine can be accurately and automatically rewound instead of manually rewinding the film by a user like a conventional camera. Thus, reloading operation can be easily performed.

What is claimed is:

1. A camera capable of feeding a film out of a film magazine comprising:

engaging shaft means for engaging a spool contained in a film magazine loaded in the camera;

engagement detecting means for detecting that said engaging shaft means engages said spool of said film magazine in a manner to cause said spool to be rotated by said engaging shaft means;

driving means for rotatively driving said engaging shaft means;

rotational quantity detecting means for detecting a rotational quantity of said engaging shaft means;

controlling means for driving said driving means responsive to an output of said engagement detecting means and controlling the rotational quantity responsive to said rotational quantity detecting means;

wherein said engaging shaft means is provided with an annular conductive member; and said engagement detecting means comprising contact switch means mounted in said camera and slidably engaging a peripheral surface of said engaging shaft means and contacting said annular conductive member to provide an output only when said engaging shaft means is drivingly connected with said spool.

2. The camera according to claim 1, wherein said engaging shaft means includes a rewind fork.

3. The camera according to claim 1, wherein said driving means includes an electric motor.

4. The camera according to claim 1, wherein said rotational quantity detecting means includes a photointerrupter for generating signals in cooperation with a rotatable member rotated responsive to rotation of said shaft means.

5. A camera according to claim 1 further comprising receiving means for receiving film sent from said film magazine;

receipt detecting means responsive to said rotational quantity detecting means for determining whether said receiving means receives said sent film or not; and said controlling means further including means for controlling a driving state of said driving means based on an output of said receipt detecting means.

6. A camera according to claim 5 wherein said controlling means further comprises means for driving the driving means to rewind film by rotating said engaging shaft through a rotational amount which represents a film amount sent by the engaging shaft, when the receiving means has not received the sent film.

7. A camera according to claim 1 wherein said contact switch means comprises a pair of resilient contact members for providing an output when said contact members contact said annular conductive member.

8. A camera comprising:

a film magazine storage compartment for loading a film magazine having a rotatable spool in its inner part;

a rotation transmitting shaft being rotatably and linearly movably mounted and aligned in an axial direction which is collinear with an axial direction of a cartridge spool loaded into said compartment, and projecting into said film magazine storage compartment, said rotation transmitting shaft being releasably connectable with said spool;

a driving source for driving said rotation transmitting shaft;

detecting means for detecting that said rotation transmitting shaft is in a position along said axial direction for driving connection with said spool;

controlling means for controlling a driving state of said driving source based on an output of said detecting means wherein said enagaging shaft means is provided with an annular conductive member; and said engagement detecting means comprising contact switch means mounted in said camera and slidably engaging a peripheral surface of said engaging shaft means and contacting said annular conductive member to provide an output only when said engaging shaft means is drivingly connected with said spool.

9. The camera according to claim 8, wherein said rotation transmitting shaft is provided with a fork member on its end surface and is connected to said spool by causing said fork member to enter a hole provided at an end surface of said spool and having a shape substantially conforming to a shape of said fork member inserted into said hole.

10. The camera according to claim 8, wherein said driving source rotates said spool in a film sending direction through said rotation transmitting shaft.

11. The camera according to claim 8, wherein said driving source rotates said spool in a film rewinding direction through said rotation transmitting shaft.

12. The camera according to claim 8, wherein said controlling means includes means for driving said driving source for a predetermined period and stopping drive of said driving source when an output of said detecting means is not obtained.

13. The camera according to claim wherein said controlling means includes means for driving said driving source for a predetermined rotational driving quantity and stopping drive of said driving source when an output of said detecting means is not obtained.

14. A camera according to claim 8 wherein said controlling means further comprises means for controlling an amount of rotation of said driving shaft source responsive to a shaft rotation detecting means for detecting rotation of said shaft.

15. A camera comprising:

a driving shaft connectable to a spool in a film magazine for selectively rotating the spool in feed and rewind directions;

a driving source for driving said driving shaft;

detecting means for detecting whether said spool is connected to said driving shaft or not;

controlling means for controlling rotation of said driving shaft responsive to an output of said detecting means.

wherein said driving shaft means is provided with an annular conductive member; and said detecting means comprising contact switch means mounted in said camera and slidably engaging a peripheral surface of said engaging shaft means and contacting said annular conductive member to provide an output only when said engaging shaft is drivingly connected with said spool.

16. A camera comprising:

a rotation transmitting shaft connectable to a spool in a film magazine by moving said rotation transmitting shaft in an axial direction;

a driving source for driving said rotation transmitting shaft;

detecting means for detecting a position of said rotation transmitting shaft along said axial direction;

controlling means for controlling a driving state of said driving source responsive to an output of said detecting means wherein said rotation transmitting shaft is provided with an annular conductive member; and said detecting means comprising contact switch means mounted in said camera and slidably engaging a peripheral surface of said engaging shaft means and contacting said annular conductive member to provide an output only when said rotation transmitting shaft is drivingly connected with said spool.

17. The camera according to claim 16, wherein a resilient force is applied to said rotation transmitting shaft to urge said shaft in a direction toward said spool.

18. The camera according to claim 16, wherein an end surface of said rotation transmitting shaft is connected to an end surface of said spool.

19. The camera according to claim 18, wherein said rotation transmitting shaft is provided with a fork member on its end surface and is connected to said spool by causing said fork member to enter a hole provided in an end surface of said spool, said hole having a shape conforming to a shape of said fork members.

20. The camera according to claim 18, wherein said rotation transmitting shaft has a hole in an end surface and is connected to said spool by causing a fork member provided on the end surface of said spool to enter the hole, said hole having a shape conforming to a shape of said fork member.

21. The camera according to claim 16, wherein said controlling means drives said driving source and drives said driving source in a film sending direction of said spool when said rotation transmitting shaft is connected to said spool.

22. The camera according to claim 16, wherein said controlling means includes means for said driving source for a predetermined period and stopping drive of said driving source when an output of said detecting means does not indicate connection of said rotation transmitting shaft and said spool.

23. The camera according to claim 16, wherein said controlling means includes means for driving said driving source for a predetermined driving quantity in its film sending direction and stopping drive of said driving source when an output of said detecting means does not indicate connection of said rotation transmitting shaft and said spool.

24. A camera capable of sending film arranged in a film magazine comprising:

rolling spool means for rolling film from a film magazine loaded in the camera;

spool driving means for driving said rolling spool in order to roll said film;

engaging shaft means for engaging a spool included in said film magazine in order to send said film from said film magazine and to rewind said film into said film magazine;

sending driving means for rotatively driving said engaging shaft means and sending said film toward said rolling spool;

rewind driving means for rotatively driving said engaging shaft means in a reverse direction and rewinding said film into said film magazine;

engagement detecting means for detecting that said engaging shaft means engages the spool in said film magazine;

rotational quantity detecting means for detecting a rotational quantity of said engaging shaft means; and controlling means for driving said sending driving means in order to send the film in said film magazine toward said rolling spool means and, after that, said controlling means including means for detecting an output of said rotational quantity detecting means by receiving an output of said engagement detecting means, when said output of said rotational quantity detecting means attains a first predetermined film sent quantity, said controlling means stopping drive of said sending driving means and driving said spool driving means, so that said film is wound around said spool means, said controlling means further including means for detecting that said output of said rotational quantity detecting means attains a second predetermined rolled quantity and stopping drive of said spool driving means, when said second predetermined rolled quantity, cannot be detected in a given time interval, said controlling means stopping the drive of said spool driving means and driving said rewind driving means, when said output of said rotational quantity detecting means reaches a quantity which is the same as a quantity counted by said rotational quantity detecting means during the winding operation, said controlling means stopping drive of said rewind driving means.

25. The camera according to claim 24, wherein said engaging shaft means includes; a rewind fork.

26. The camera according to claim 24, wherein said driving means includes an electric motor.

27. The camera according to claim 24, wherein said rotational quantity detecting means includes a photo-interrupter.

28. A camera capable of sending film arranged in a film magazine comprising:

rolling spool means for rolling film from a film magazine loaded in the camera;

spool driving means for driving said rolling spool means in order to roll said film;

engaging shaft means engaging a spool included in said film magazine in order to selectively send said film from said film magazine and to rewind said film into said film magazine;

engaging shaft driving means for rotatively driving said engaging shaft means and sending said film toward said rolling spool, said engaging shaft driving means for rotatively driving said engaging shaft means in a reverse direction so that said film can be rewound into said film magazine;

engagement detecting means for detecting that said engaging shaft means engages a spool of said film magazine;

rotational quantity detecting means for detecting a rotational quantity of said engaging shaft means; and controlling means for driving said engaging shaft driving means in order to send the film in said film magazine toward said rolling spool means and, after that, said controlling means including means for detecting an output of said rotational quantity detecting means by receiving an output of said rotational quantity engagement detecting means, when said output of said rotational quantity detecting means attains a first predetermined film sent quantity, said controlling means stopping drive of said engaging shaft driving means and driving said spool driving means, so that said film is wound around said spool means, said controlling means further comprising means for detecting a second predetermined quantity and stopping drive of said spool driving means, when said second predetermined quantity cannot be detected in a given time interval, said controlling means stopping the drive of said spool driving means and driving said engaging shaft driving means in a reverse direction, and, when said output of said rotational quantity detecting means reaches a quantity which is the same as a quantity detected by said rotational quantity detecting means during film winding, said controlling means stopping the drive of said engaging shaft driving means.

29. The camera according to claim 28, wherein said engaging shaft means includes a rewind fork.

30. The camera according to claim 28, wherein said driving means includes an electric motor.

31. The camera according to claim 28, wherein said rotational quantity detecting means includes a photo-interrupter.

32. A camera comprising:

a film magazine storage compartment for loading a film magazine having a spool for rolling film in its inner part;

a rotation transmitting shaft being rotatably and movably provided in a shaft direction and projecting into said film magazine storage compartment, said rotation transmitting shaft being releasably connected to said spool, said rotation transmitting shaft selectively driving said film in one of a sending direction for feeding film from said film magazine and a rewinding direction for rewinding film into said film magazine;

shaft position detecting means for detecting that said rotation transmitting shaft is positioned along an axial direction to determine that said shaft is drivingly connected to said spool;

a rolling shaft rotatively driven when a predetermined quantity of said film is sent from said film magazine to said rolling shaft, said rolling shaft for rolling film sent thereto;

film movement detecting means including means for detecting rotation of said transmitting shaft for detecting movement of said film; and controlling means including means for driving said driving source in a direction of sending said film when an output of said shaft position detecting means is obtained, and means for stopping drive of said rolling shaft and driving said rotation transmitting shaft in a film rewinding direction when an output of said film movement detecting means cannot be obtained even if said rolling shaft is driven and a predetermined period has passed.

33. The camera according to claim 32, wherein said rotation transmitting shaft is provided with a fork member on its end surface and is connected to said spool by causing said fork member to enter a hole provided in an end surface of said spool, said hole having a shape conforming to a shape of said fork member.

34. The camera according to claim 32, wherein said rotation transmitting shaft has a hole in an end surface and is connected to said spool by causing a fork member provided on an end surface of said spool to enter said hole, said hole having a shape conforming to a shape of said for member.

35. A film feeding mechanism of a camera for sending film rolled around a shaft member in a film magazine out of said magazine by rotating said shaft member, comprising:

rotation transmitting means for sending said film by rotating said shaft member in a given direction;

rotation driving means for driving said rotation transmitting means;

connection detecting means for detecting whether said rotation transmitting means is connected to said shaft member or not;

transmission rotational quantity controlling means for controlling rotational quantity of said rotation transmitting means in response to an output of said connection detecting means wherein said engaging shaft means is provided with an annular conductive member; and said engagement detecting means comprising contact switch means mounted in said camera and slidably engaging a peripheral surface of said engaging shaft means and contacting said annular conductive member to provide an output only when said engaging shaft means is drivingly connected with said spool.

36. The film feeding mechanism according to claim 35, wherein said transmission rotational quantity controlling means includes means for stopping said rotation driving means when a connecting signal of said rotation transmitting means and said shaft member cannot be obtained within a period of at least one of a predetermined time and predetermined rotational quantity.

37. The film feeding mechanism according to claim 35, wherein said transmission rotational quantity controlling means includes rotational quantity detecting means for detecting a rotational quantity of said rotation transmitting means and a controlling means for controlling said rotation driving means in response to a signal of said rotational quantity detecting means.

38. The film feeding mechanism according to claim 37, wherein said rotational quantity detecting part outputs a signal in response to an output signal of said connection detecting means.

39. The film feeding mechanism according to claim 37, wherein said rotational quantity detecting part outputs a signal only when said shaft member and said rotation transmitting means are connected.

40. The film feeding mechanism according to claim 39, wherein said connection detecting means outputs a detecting signal in response to an output signal of said shaft member and said rotational quantity detecting part.

41. A camera according to claim 1 further comprising a rolling shaft and means for rotating said rolling shaft responsive to a given amount of rotation detected by said rotational quantity detecting means causing said rolling shaft to take up said film; and said controlling means including means for stopping drive of said rolling shaft when an output of said rotational quantity detecting means is not obtained as said rolling shaft is driven and a predetermined period has passed.

* * * * *